(12) United States Patent
Wang et al.

(10) Patent No.: US 9,886,098 B2
(45) Date of Patent: Feb. 6, 2018

(54) PERSONALITY IDENTIFIED SELF-POWERING KEYBOARD

(71) Applicant: Georgia Tech Research Corporation, Atlanta, GA (US)

(72) Inventors: Zhong Lin Wang, Atlanta, GA (US); Guang Zhu, Atlanta, GA (US); Jun Chen, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 64 days.

(21) Appl. No.: 14/962,693

(22) Filed: Dec. 8, 2015

(65) Prior Publication Data

US 2017/0160817 A1     Jun. 8, 2017

(51) Int. Cl.
| | |
|---|---|
| G06F 3/023 | (2006.01) |
| G06F 3/02 | (2006.01) |
| G06F 21/32 | (2013.01) |
| H02N 1/04 | (2006.01) |
| G06F 3/044 | (2006.01) |

(52) U.S. Cl.
CPC ............ G06F 3/023 (2013.01); G06F 3/0202 (2013.01); G06F 21/32 (2013.01); H02N 1/04 (2013.01); *G06F 3/044* (2013.01)

(58) Field of Classification Search
CPC .......................................... G06F 3/041–3/0418
See application file for complete search history.

(56) References Cited

U.S. PATENT DOCUMENTS

| | | | | |
|---|---|---|---|---|
| 9,430,626 | B1* | 8/2016 | Rome | G06F 21/316 |
| 2013/0049531 | A1* | 2/2013 | Wang | H02N 1/04 310/309 |
| 2013/0094719 | A1* | 4/2013 | Haddad | G06F 3/011 382/115 |
| 2014/0246950 | A1* | 9/2014 | Wang | H02N 1/04 310/310 |
| 2014/0300248 | A1* | 10/2014 | Wang | H02N 1/04 310/300 |
| 2014/0313141 | A1* | 10/2014 | Park | G06F 1/1635 345/173 |
| 2014/0338458 | A1* | 11/2014 | Wang | G01L 1/005 73/658 |
| 2015/0049056 | A1* | 2/2015 | Post | G06F 3/046 345/174 |
| 2015/0242057 | A1* | 8/2015 | Galela | G06F 3/0428 345/175 |
| 2016/0124555 | A1* | 5/2016 | Hong | G06F 3/016 345/173 |

\* cited by examiner

*Primary Examiner* — Gene W Lee

(74) *Attorney, Agent, or Firm* — Troutman Sanders LLP; Ryan A. Schneider; Dan Li

(57) ABSTRACT

A keyboard for converting keystrokes into electrical signals is disclosed. The keyboard includes a plurality of keys. At least one of the keys includes two electrodes and a member that generates triboelectric charges upon skin contact. The member is adjacent to one of the electrodes to affect a flow of electrons between the two electrodes when a distance between the member and the skin varies.

46 Claims, 36 Drawing Sheets

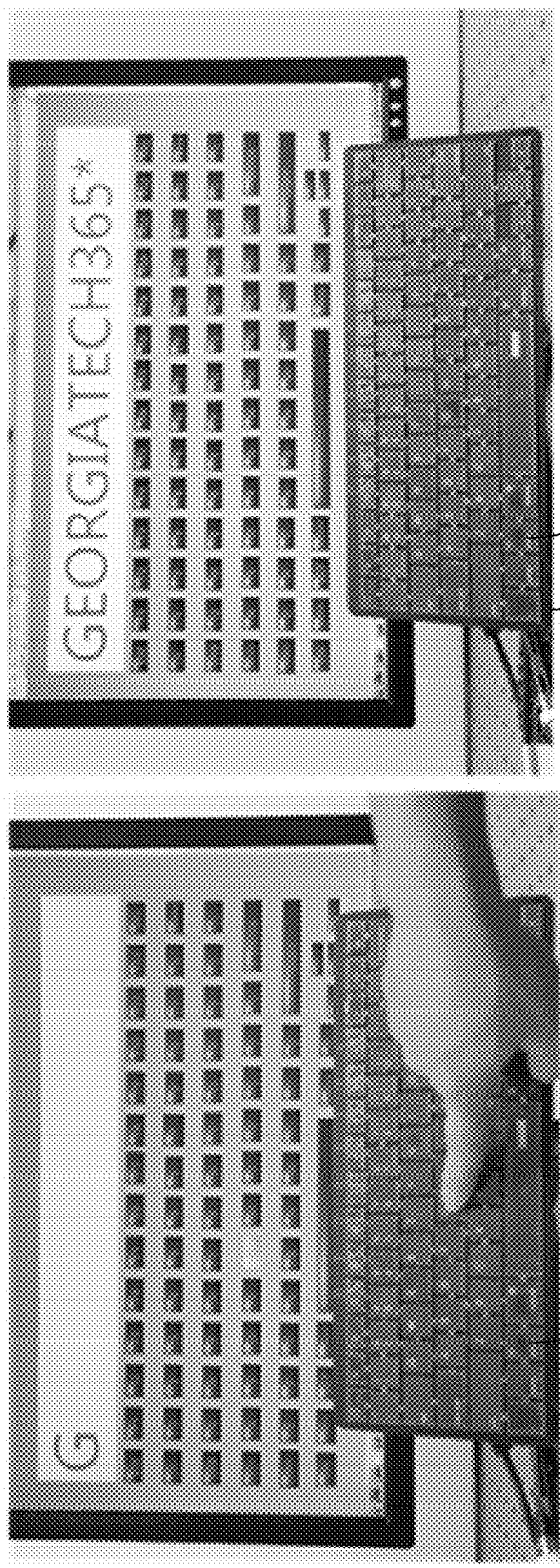

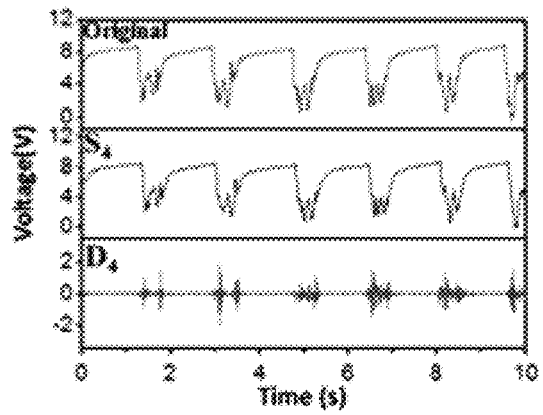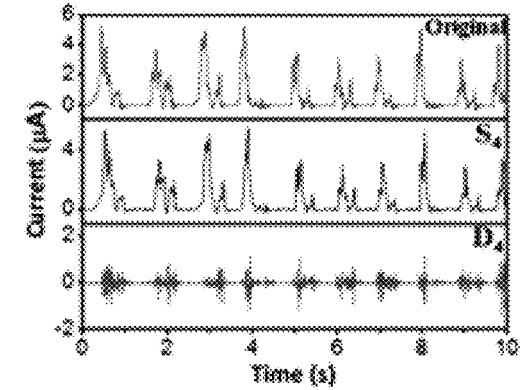
FIG. 10A
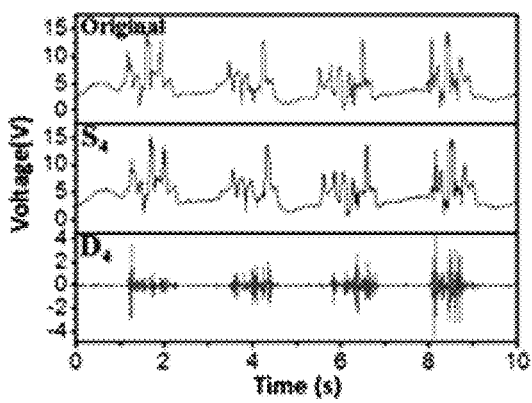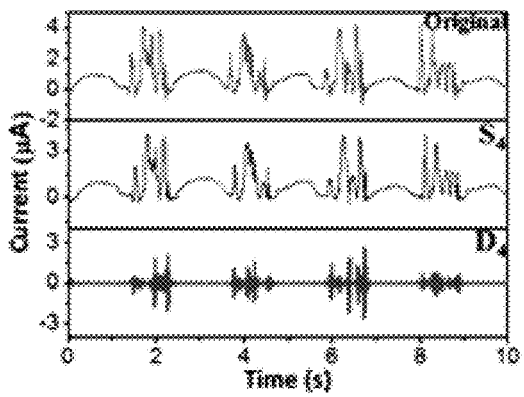
FIG. 10B
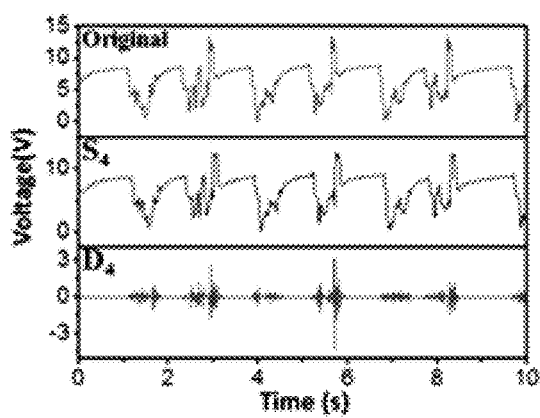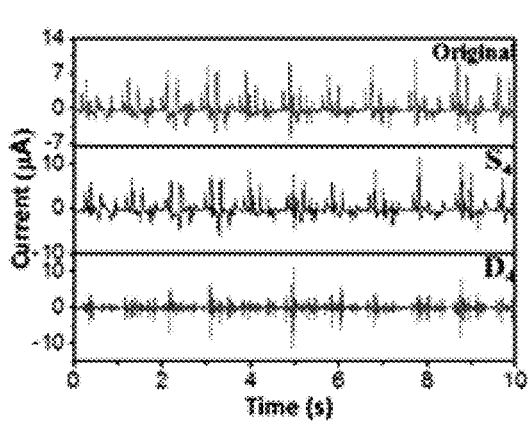
FIG. 10C

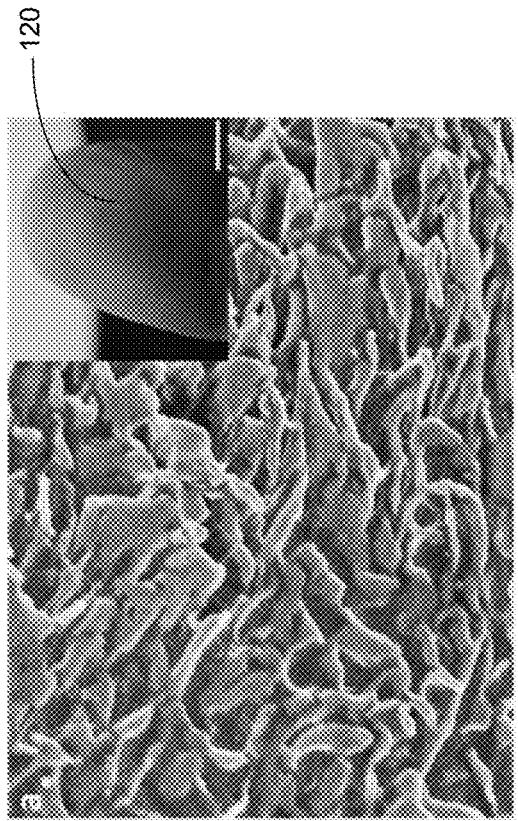
FIG. 23A
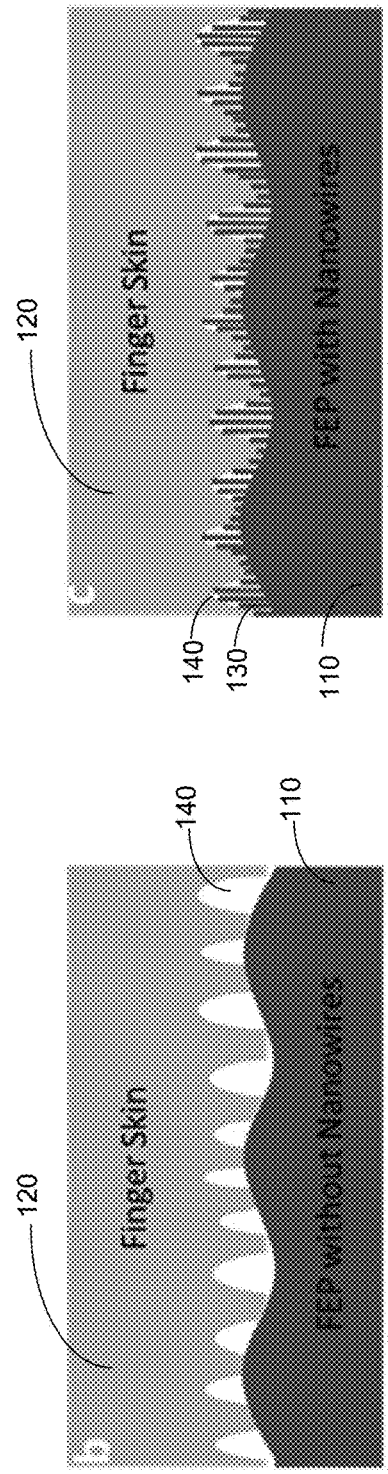
FIG. 23B
FIG. 23C

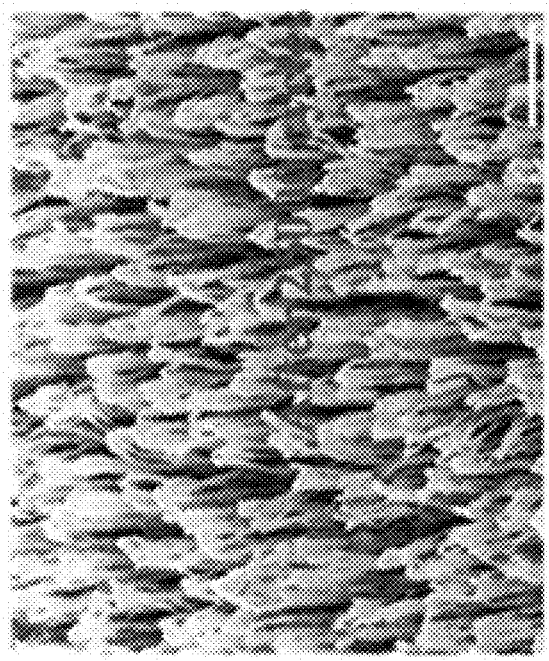
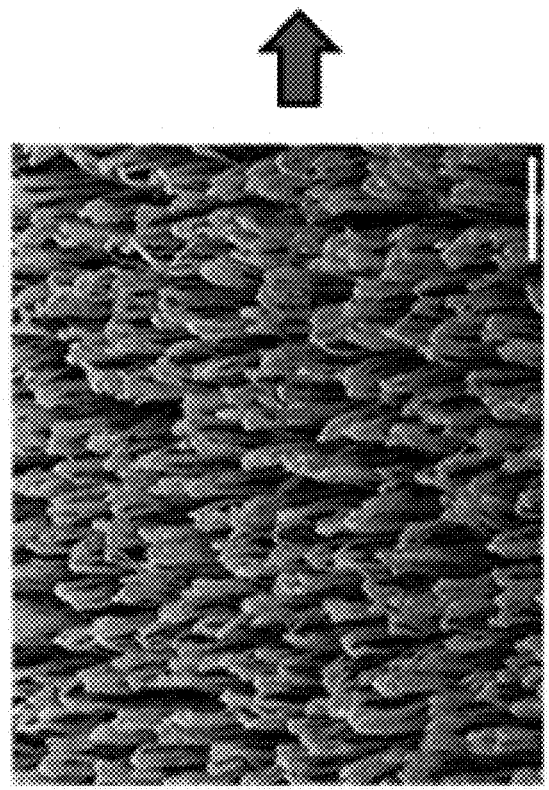
FIG. 28A

PERSONALITY IDENTIFIED SELF-POWERING KEYBOARD

STATEMENT OF GOVERNMENT INTEREST

This invention was made with government support under agreement No. DE-FG02-07ER46394, awarded by the Department of Energy. The government has certain rights in the invention.

TECHNICAL FIELD DISCLOSED

Embodiments of the disclosed technology generally relate to a keyboard for authentication and power generation purposes. The keyboard generates triboelectric charges upon skin contact and recognizes biometrics based on keystroke dynamics.

BACKGROUND DISCLOSED

Current computer security measures have many flaws. For example, conventional security measures such as personal identification information, tokens, or passwords are vulnerable to illegitimate activities. An identity thief may easily steal such personal identification information. Biometric identifiers provide a better protection as the biometric identifiers are intrinsic to the true owner and harder to be mimicked by the thief. Keystroke dynamics have been investigated as biometric identifiers based on keystroke timing information. However, the biometric identifiers based on the keystroke timing information alone are not effective and lack universality, uniqueness, permanence and accuracy. Accordingly, biometric identifiers as such have limited practicability and acceptability.

There is a need for developing effective an biometric identifier based on keystroke dynamics. There is also a need for an authentication solution to recognize and apply the biometric identifier. Further, there is a need for harvesting typing energy.

BRIEF SUMMARY DISCLOSED

One aspect of the disclosed technology relates to a keyboard. The keyboard includes a plurality of keys. At least one of the keys includes two electrodes and a member that generates triboelectric charges upon skin contact. The member is adjacent to one of the electrodes to affect a flow of electrons between the two electrodes when a distance between the member and the skin varies.

Another aspect of the disclosed technology relates to a system for determining information related to a keystroke event. The system includes a keyboard having a surface that generates triboelectric charges upon skin contact. The keyboard is configured to generate a current and a voltage when a keystroke event occurs. An acquisition system is in communication with the keyboard to acquire a measurement of at least one of the current and the voltage. A processor is in communication with the acquisition system to determine information related to the keystroke event based on the measurement.

Yet another aspect of the disclosed technology relates to a method for determining information related to a keystroke event. A keyboard generates a current and a voltage when a keystroke event occurs. The keyboard includes a surface that generates triboelectric charges upon skin contact. An acquisition system acquires a measurement of at least one of the current and the voltage generated by the keyboard. A processor determines information related to the keystroke event based on the measurement.

A further aspect of the disclosed technology relates to an authentication system. The system includes a keyboard having a surface that generates triboelectric charges upon skin contact. The keyboard is configured to generate a current and a voltage when a user performs a keystroke event. An acquisition system is in communication with the keyboard to acquire a measurement of at least one of the current and the voltage. A non-transitory computer-readable storage medium stores authentication information. A processor is in communication with the acquisition system to determine information related to the keystroke event based on the measurement. The processor authenticates the user by comparing the determined information to the authentication information.

One aspect of the disclosed technology relates to a power generation system. The system includes a keyboard having a plurality of keys. At least one of the keys includes two electrodes and a member that generates triboelectric charges upon skin contact. The member is adjacent to one of the electrodes to affect a flow of electrons between the two electrodes when a distance between the member and the skin varies.

Another aspect of the disclosed technology relates to an alarming system. The system includes an alarm, a non-mechanical keyboard and a signal-processor circuit. The circuit is coupled to the keyboard and in operational communication with the alarm. The circuit is configured to set off the alarm when a keystroke occurs on the keyboard.

Yet another aspect of the disclosed technology relates to an input device. The input device has a plurality of keystroke input members. At least one of the members includes two electrodes and a layer that generates triboelectric charges upon skin contact. The layer generates a flow of electrons between the two electrodes when a keystroke occurs.

A further aspect of the disclosed technology relates to a key for a keyboard. The key includes two electrodes and a layer that generates triboelectric charges upon skin contact. The layer generates a flow of electrons between the two electrodes when a distance between the key and the skin varies.

These and other aspects of the disclosed technology are described in the Detailed Description disclosed below and the accompanying figures. Other aspects and features of embodiments of the disclosed technology will become apparent to those of ordinary skill in the art upon reviewing the following description of specific, exemplary embodiments of the disclosed technology in concert with the figures. While features of the disclosed technology may be discussed relative to certain embodiments and figures, all embodiments of the disclosed technology can include one or more of the features discussed herein. While one or more embodiments may be discussed as having certain advantageous features, one or more of such features may also be used with the various embodiments of the disclosed technology discussed herein. In similar fashion, while exemplary embodiments may be discussed below as system or method embodiments, it is to be understood that such exemplary embodiments may be implemented in various devices, systems, and methods of the disclosed technology.

BRIEF DESCRIPTION OF THE DRAWINGS

The following Detailed Description technology is better understood when read in conjunction with the appended drawings. For the purposes of illustration, there is shown in the drawings exemplary embodiments, but the subject matter is not limited to the specific elements and instrumentalities disclosed. Unless instructed otherwise, figures may not be drawn to scale.

FIGS. 9A-B illustrate continuously typing a string "GEORGIATECH365*" on the keyboard according to one aspect of the disclosed technology.

FIGS. 10A-C respectively illustrate typing patterns of three typists as well as their corresponding $S_4$ and $D_4$ after Daubechies Wavelet of order 4 (DB4) transformation according to one aspect of the disclosed technology.

FIG. 23A provides an SEM image of a human finger surface, and an inset showing a photograph of the human finger surface.

FIG. 23B illustrates a surface contact area between the human finger skin and the keyboard surface in the absence of nanowires at a keystroke event.

FIG. 23C illustrates a surface contact area between the human finger skin and the keyboard surface in the presence of nanowires at a keystroke event.

FIG. 28A provides SEM images of the FEP nanowires before (left image) and after (right image) 25000 keystrokes.

DETAILED DESCRIPTION

To facilitate an understanding of the principles and features of the various embodiments of the present invention, various illustrative embodiments are explained below. Although exemplary embodiments of the present invention are explained in detail, it is to be understood that other embodiments are contemplated. Accordingly, it is not intended that the present invention is limited in its scope to the details of construction and arrangement of elements set forth in the following description or examples. The present invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

By "comprising" or "containing" or "including" is meant that at least the named element or method step is present in the system or method, but does not exclude the presence of other elements or method steps, even if the other such elements or method steps have the same function as what is named.

It is also to be understood that the mention of one or more method steps does not preclude the presence of additional method steps or intervening method steps between those steps expressly identified. Similarly, it is also to be understood that the mention of one or more elements in a system does not preclude the presence of additional elements than those expressly identified. Such other elements or steps not described herein can include, but are not limited to, for example, similar elements or steps that are developed after development of the disclosed technology.

The materials described as making up the various elements of the present invention are intended to be illustrative and not restrictive. Many suitable materials that would perform the same or a similar function as the materials described herein are intended to be embraced within the scope of the present invention. Such other materials not described herein can include, but are not limited to, for example, materials that are developed after the time of the development of the present invention.

1. Intelligent Keyboard 1.1 Structure

Figure 1:
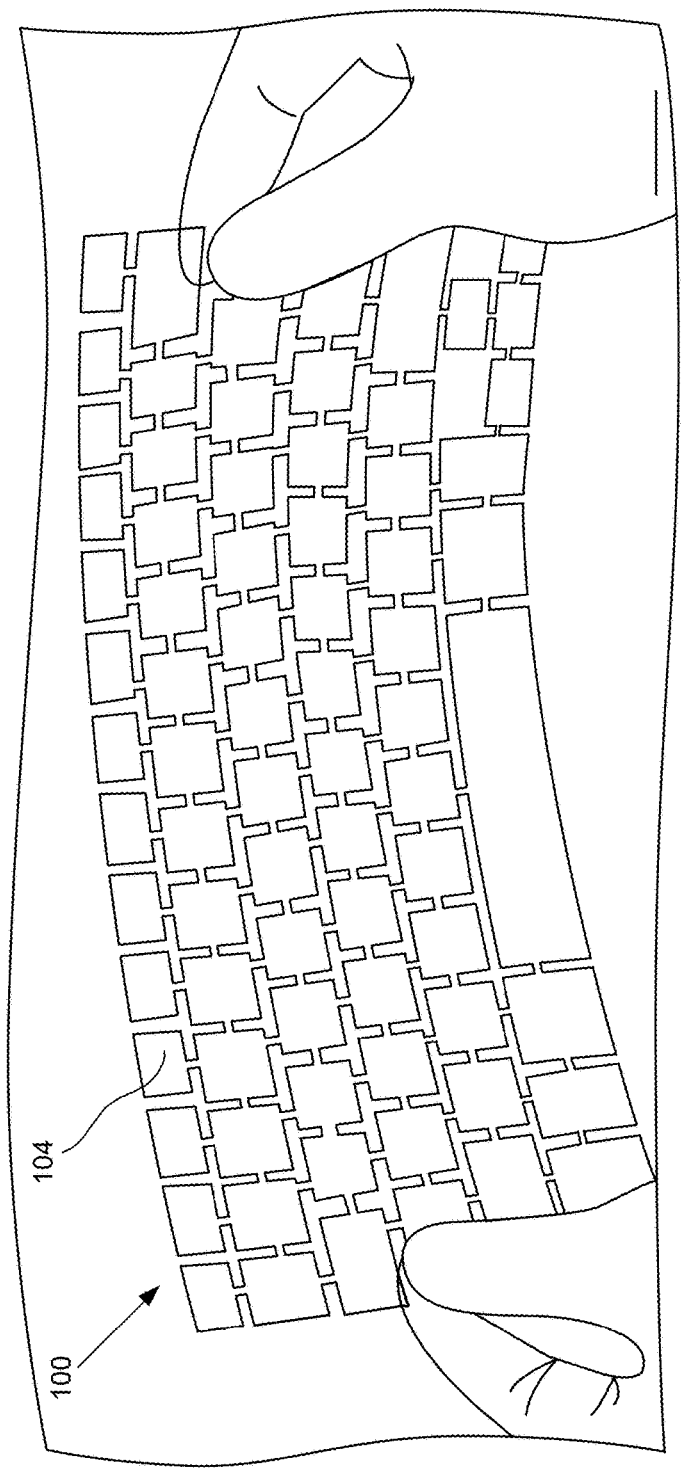
FIG. 1 illustrates a keyboard according to one aspect of the disclosed technology.

FIG. 1 is a schematic illustration of an intelligent input device or an intelligent keyboard 100 according to one aspect of the disclosed technology. The scale bar in FIG. 1 may be approximately 3 cm. The keyboard 100 may be made of one or more materials that are flexible and transparent. As a result, the keyboard 100 as a whole may be flexible and transparent. The keyboard 100 may include a plurality of keystroke input members or keys 104 that are interconnected to together form one integrated piece. Unlike known mechanical keyboards, the keyboard 100 does not have an individual switch under every key. Rather, each key 104 may be a non-mechanical-punching key 104.

Figure 2:
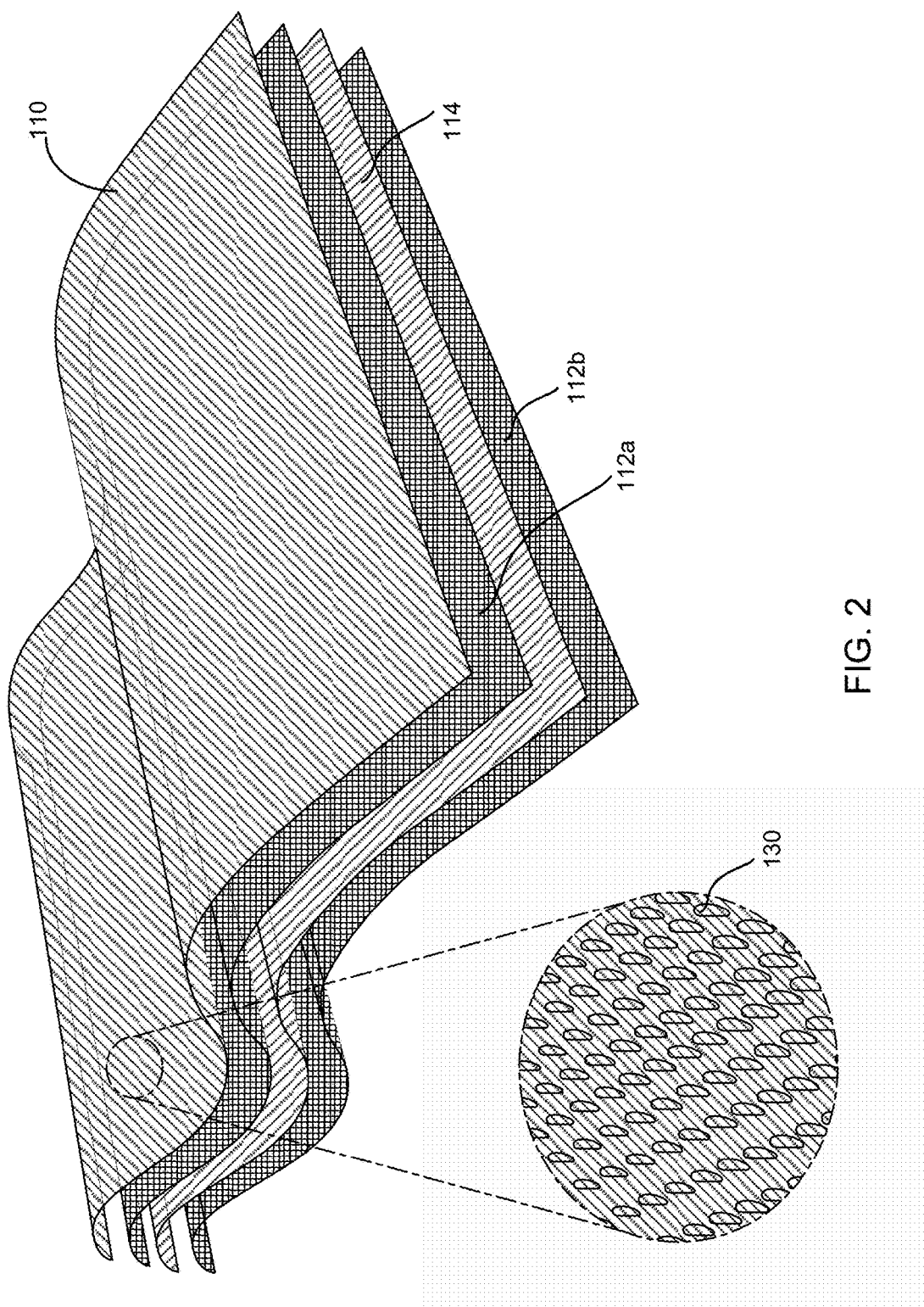
FIG. 2 provides a schematic illustration of layers in the keyboard according to one aspect of the disclosed technology.

Each key 104 may include a plurality of vertically stacked layers of transparent thin film materials, as shown in FIG. 2. Each key 104 may include a member or a surface layer 110. The layer 110 may have triboelectric characteristics, a triboelectric series rating, a triboelectric polarity, or a charge affinity different from that of human skin. The layer 110 may generate triboelectric charges upon skin contact. Table 1 provides a list of insulation materials and their charge affinity.

TABLE 1

Triboelectric table.

| Column 1: Insulator name. | Column 2: Charge affinity in nC/J. | Column 3: Notes. |
|---|---|---|
| Human hand, oily skin | +45 | Skin is conductive. Cannot be charged by metal rubbing. |
| Solid polyurethane, filled | +40 | Slightly conductive. (8 T ohm cm). |
| Magnesium fluoride (MgF2) | +35 | Anti-reflective optical coating. |
| Nylon | +30 | |
| Machine oil | +29 | |
| Nylatron (nylon filled with MoS$_2$) | +28 | |
| Glass (soda) | +25 | Slightly conductive. (Depends on humidity). |
| Paper (uncoated copy) | +10 | Slightly conductive. |
| Wood (pine) | +7 | |
| GE brand Silicone II (hardens in air) | +6 | More positive than the other silicone chemistry. |
| Cotton | +5 | Slightly conductive. (Depends on humidity). |
| Nitrile rubber | +3 | |
| Wool | 0 | |
| Polycarbonate | −5 | |
| ABS | −5 | |
| Acrylic (polymethyl methacrylate) | −10 | |
| Epoxy (circuit board) | −32 | |
| Styrene-butadiene rubber (SBR, Buna S) | −35 | Sometimes inaccurately called "neoprene" (see below). |
| Solvent-based spray paints | −38 | May vary. |
| PET (mylar) cloth | −40 | |
| PET (mylar) solid | −40 | |
| EVA rubber for gaskets, filled | −55 | Filled rubber will usually conduct. |
| Gum rubber | −60 | Barely conductive. (500 T ohm cm). |
| Hot melt glue | −62 | |
| Polystyrene | −70 | |
| Polyimide | −70 | |
| Silicones (air harden & thermoset, but not GE) | −72 | |
| Vinyl: flexible (clear tubing) | −75 | |
| Carton-sealing tape (BOPP) | −85 | Raw surface is very +, but close to PP when sanded. |
| Olefins (alkenes): LDPE, HDPE, PP | −90 | UHMWPE is below. |
| Cellulose nitrate | −93 | |
| Office tape backing | −95 | |
| UHMWPE | −95 | |
| Neoprene (polychloroprene, not SBR) | −98 | Slightly conductive if filled (1.5 T ohm cm). |
| PVC (rigid vinyl) | −100 | |
| Latex (natural) rubber | −105 | |
| Viton, filled | −117 | Slightly conductive. (40 T ohm cm). |
| Epichlorohydrin rubber, filled | −118 | Slightly conductive. (250 G ohm cm). |
| Santoprene rubber | −120 | |
| Hypalon rubber, filled | −130 | Slightly conductive. (30 T ohm cm). |
| Butyl rubber, filled | −135 | Conductive. (900M ohm cm). Test was done fast. |
| EDPM rubber, filled | −140 | Slightly conductive. (40 T ohm cm). |
| FEP, PTFE (Teflon) | −190 | Surface is fluorine atoms-- very electronegative. |

In one example, the layer 110 may include a material with a relatively less negative triboelectric series rating, or with a propensity to gain electrons upon skin contact. Examples of suitable materials for the layer 110 may include, but not limited to, anyone or a combination of the following materials: polyethylene terephthalate (PET), poly (methyl methacrylate) (PMMA), polydimethylsiloxane (PDMS), polytetrafluoroethylene (PTFE), fluorinated ethylene propylene (FEP), poly (vinyl chloride) (PVC), polyimide, metal and alloy, among many other possibilities. The skin on the other hand has a relatively more negative triboelectric series rating, or with a propensity to lose electrons upon contact. Upon skin contact, the layer 110 may generate triboelectric charges. The larger the difference in the triboelectric polarities between the layer 110 and the skin, the more the triboelectric charges being generated at a keystroke event.

With continued reference to FIG. 2, each key 104 may include two electrodes 112a and 112b. Each electrode may be in the form of a thin layer. The first electrode 112a may be placed immediately below the layer 110. The electrodes 112a-b may include, but not limited to, anyone or a combination of the following materials: metal such as copper, gold, silver and aluminum, indium tin oxide (ITO) and conductive polymer, among many other possibilities.

An insulation material 114 may be interposed between the two electrodes 112a-b. The insulation material 114 may be made of PET, among many other possibilities.

Figure 3:
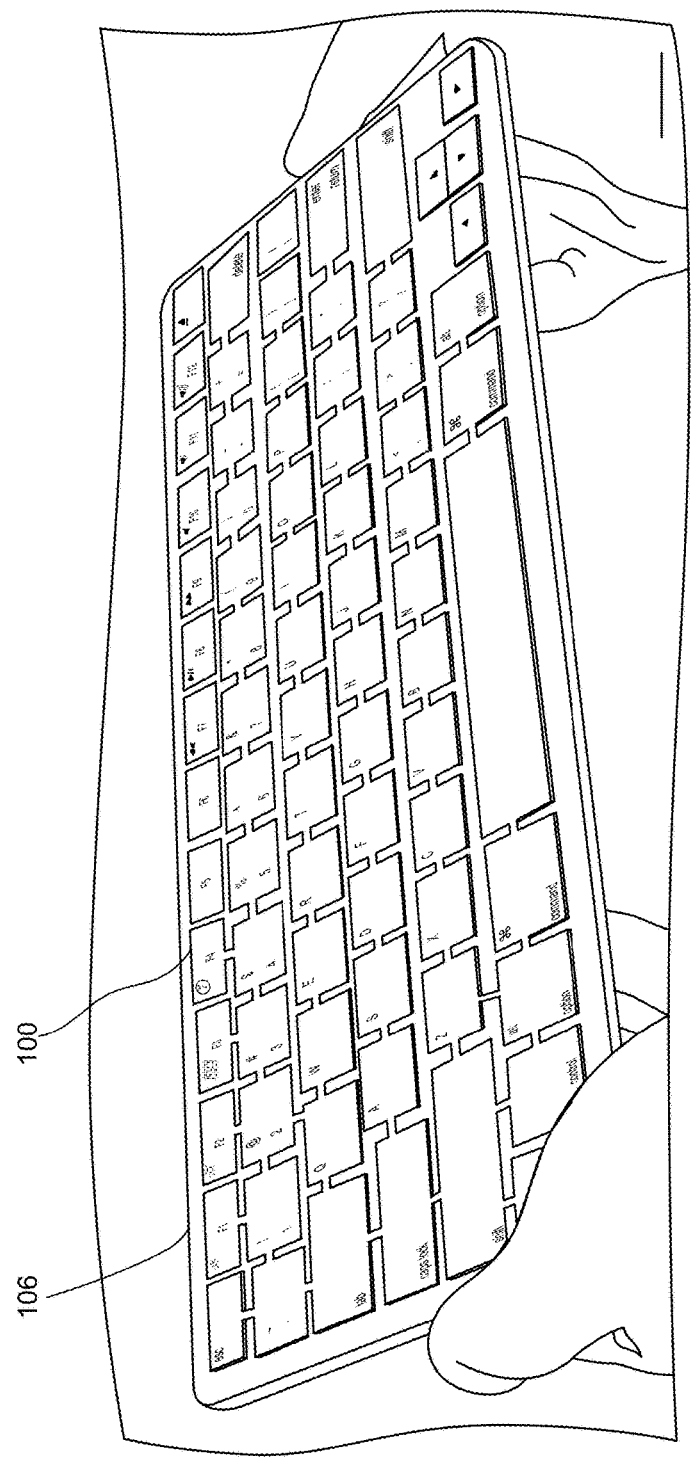
FIG. 3 illustrates the keyboard of FIG. 1 disposed over a mechanical keyboard according to one aspect of the disclosed technology.

In practice, the keyboard 100 may work independently or serve as an add-on to a mechanical keyboard 106 as shown in FIG. 3. The scale bar in FIG. 3 may be approximately 3 cm.

1.2 Fabrication

In one aspect, the keys 104 may be fabricated as follows. First, ITO may be deposited on each side of a PET substrate by way of radio frequency (RF) sputtering. Each ITO layer may have a thickness of approximately 100 nm. The PET substrate may have a thickness of approximately 50 µm. The ITO-coated PET substrate may be cut by a laser cutter into a desired shape in conformance with the layout of the keyboard 100. Next, the surface ITO layer may be selectively erased by the laser cutter to form functional electrical pathways. The top and bottom ITO electrodes may be connected by lead wires at the end of each pathway. An FEP thin film may be applied onto one side of the device as a surface layer or an electrification layer. The FEP thin film may have a thickness of 50 µm. Any redundant part of the FEP layer may be trimmed away by the laser cutter so as to conform to the PET pattern.

1.3 Working Principle

Contrary to mechanical keyboards that rely on mechanical switching, the keyboard 100 operates based on coupling between contact electrification and electrostatic induction. The keyboard 100 may convert typing motions on each key 104 into electric signals. For instance, contact electrification between the skin and the key 104 may convert mechanical stimuli applied to the key 104 into local electronic signals in the absence of an external power.

Figure 4:
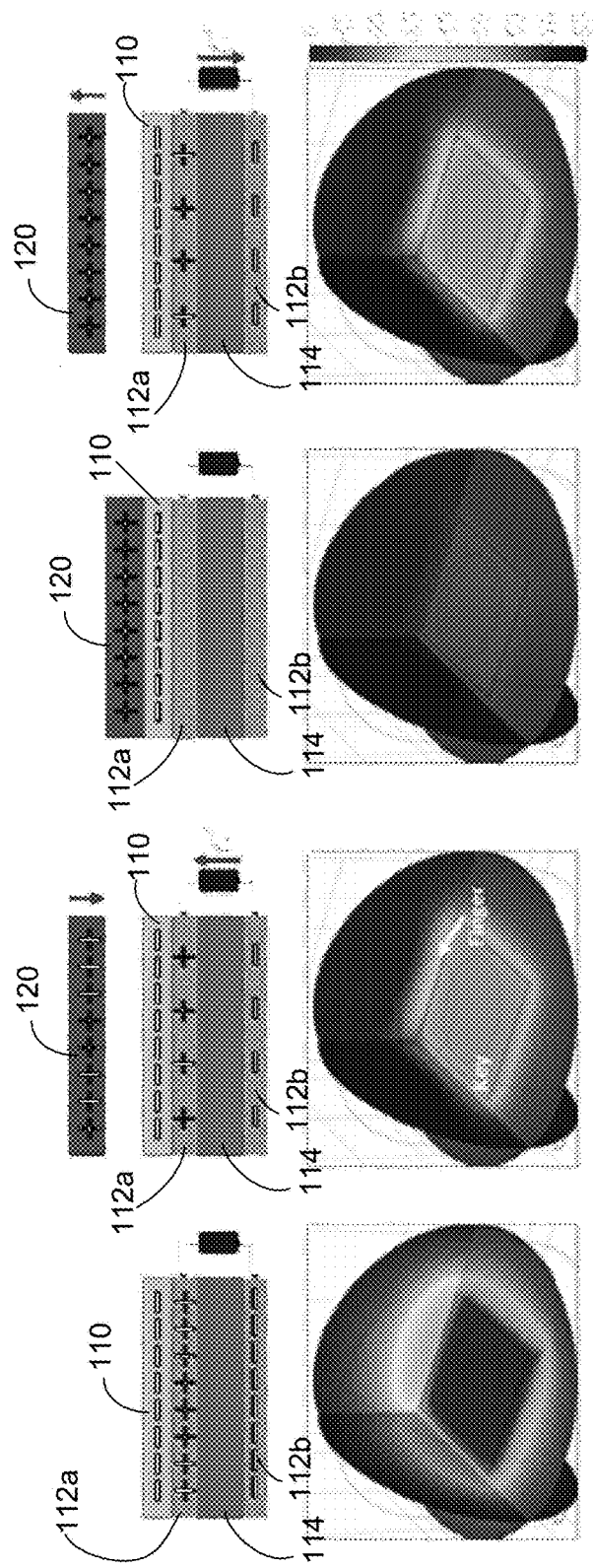
FIG. 4A provides schematic illustrations of a two-dimensional charge distribution (top image) and a three-dimensional potential distribution (bottom image) at an initial state of a power generation cycle where the keyboard surface is negatively charged after skin contact.
FIG. 4B provides schematic illustrations of a two-dimensional charge distribution (top image) and a three-dimensional potential distribution (bottom image) when a keystroke is initiated.
FIG. 4C provides schematic illustrations of a two-dimensional charge distribution (top image) and a three-dimensional potential distribution (bottom image) when the skin is in contact with a key.
FIG. 4D provides schematic illustrations of a two-dimensional charge distribution (top image) and a three-dimensional potential distribution (bottom image) when the skin leaves the keyboard surface.

Turning to FIG. 4A, in one aspect, due to discrepancies in triboelectric characteristics between the layer 110 and the skin, when the layer 110 is contacted by the skin, such as by a human finger 120, the layer 110 may attract electrons from the finger 120, resulting in negative triboelectric charges on the layer 110 and positive triboelectric charges on the finger 120.

As shown in FIG. 4A, once the finger moves away from the layer 110, the negative charges on the layer 110 may not dissipate immediately, but rather stay on the layer 110 for an extensive period of time. During this period of time, the negative charges on the layer 110 may induce positive charges on the first electrode 112a, which, in turn, may induce an equal amount of negative charges on the second electrode 112b.

Since the layer 110 is adjacent to the electrode 11a, the layer 110 may affect a flow of electrons between the two electrodes 112a and 112b when a distance between the layer 110 and the skin varies, e.g., when a keystroke occurs. For example, as shown in FIG. 4B, as the finger 120 approaches the layer 110 to initiate a keystroke, the positive charges on the first electrode 112a are expelled, resulting in a flow of free electrons from the second electrode 112b to the first electrode 112a. Once the finger 120 touches the layer 110 as shown in FIG. 4C, the electrons stop flowing. Subsequently, as shown in FIG. 4D, as the finger 120 leaves the layer 110, the free electrons flow in a reverse direction, i.e., from the first electrode 112a to the second electrode 112b.

The above steps form one full cycle of electricity generation. As such, the keyboard 100 may generate a current and a voltage when a keystroke event occurs. As shown in bottom illustrations of FIGS. 4A-D, electric potential varies throughout the cycle. Consecutive keystrokes may periodically change the electric field, and thus may drive reciprocating flows of electrons between the electrodes 112a and 112b.

2. Authentication System

Figure 5:
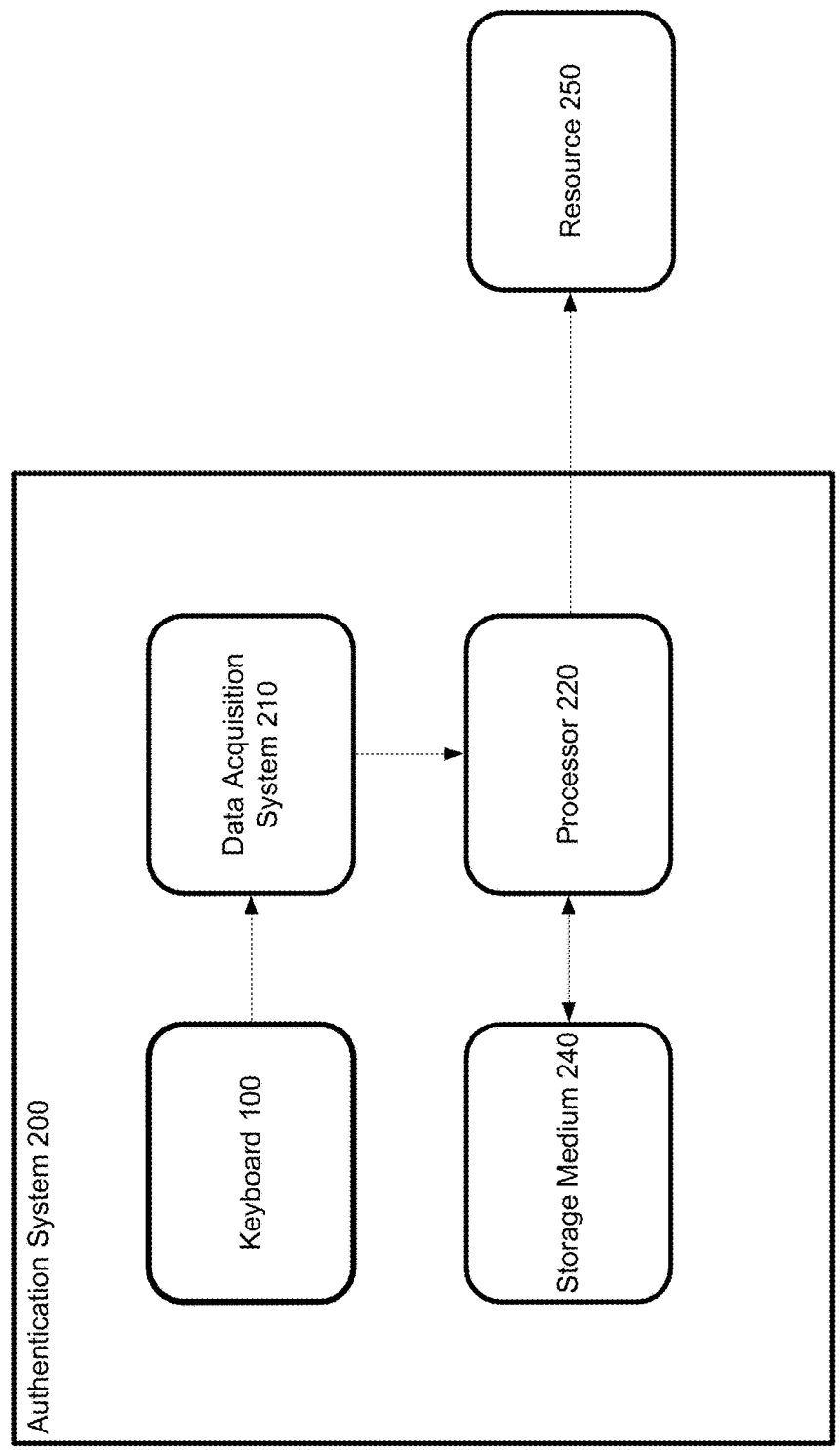
FIG. 5 provides a block diagram of an authentication system according to one aspect of the disclosed technology.

According to one aspect of the disclosed technology, the keyboard 100 may serve as part of an authentication system 200 as illustrated in FIG. 5. The authentication system 200 may provide keyboard-based information security. The authentication system 200 may trace typing motions and record typing content in real time. The authentication system 200 may identify impostors or intruders, and safeguard against unauthorized access to a resource 250.

2.1 Structure

Figure 6:
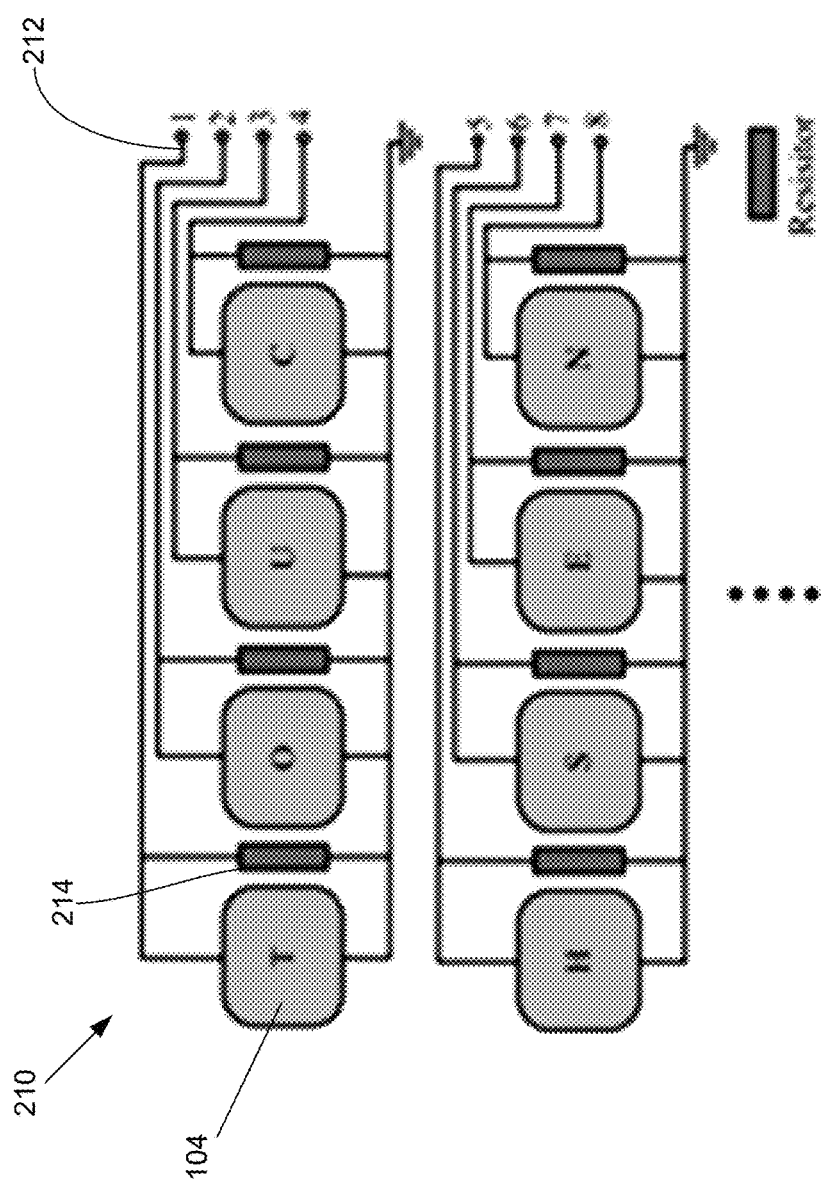
FIG. 6 provides a schematic diagram of a keyboard-based multi-channel data acquisition system for keystroke tracing and real-time recording according to one aspect of the disclosed technology.

In one embodiment as shown in FIG. 5, in addition to the keyboard 100, the authentication system 200 may include a data acquisition system 210, a processor 220, and a non-transitory computer-readable storage medium 240. The data acquisition system 210 may be a customized multi-channel data acquisition system. Each key may be individually addressed by the data acquisition system 210. An exemplary schematic diagram of the data acquisition system 210 is provided in FIG. 6. As shown in FIG. 6, the data acquisition system 210 may include a plurality of independent channels 212. Each channel 212 may be electrically connected to a key 104. For example, channels 1, 2, 3, 4, 5, 6, 7 and 8 are electrically connected to keys "T," "O," "U," "C," "H," "S," "E," and "N," respectively. Each channel may acquire a measurement of at least one of the current and the voltage generated by its associated key at a keystroke event. Each channel and its connected key may together form a functional unit. Each unit may be connected to the ground through a resistor 214. Each resistor 214 may have a resistance of about 1 MΩ.

In one embodiment, the data acquisition system 210 may include a multiplexing analog-to-digital converter. Each key 104 may be individually connected to the multiplexing analog-to-digital converter via a series resistor.

The storage medium 240 may store authentication information. The processor 220 may be in communication with the acquisition system 210 to determine information related to the keystroke event based on the measurement. The processor 210 may authenticate a user by comparing the determined information to the authentication information.

In one example, the processor 210 may determine a string of input characters associated with a plurality of keystroke events. The authentication information as stored in the storage medium 240 may include a predetermined character string.

In another example, the processor 210 may determine a behavioral biometric of a user that performs the keystroke event. The authentication information as stored in the storage medium 240 may include a predetermined behavioral biometric.

In one example, the processor 210 may determine a typing pattern of a user that performs the keystroke event. The authentication information as stored in the storage medium 240 may include a predetermined typing pattern.

In another example, the processor 210 may determine at least one of the following: keystroke manner, keystroke rhythm, typing habit, typing force, typing speed, finger dimension and bioelectricity. Similarly, the authentication information as stored in the storage medium 240 may relate to at least one of the following: keystroke manner, keystroke rhythm, typing habit, typing force, typing speed, finger dimension and bioelectricity.

2.2 Working Principle

2.2.1 Typing Content Authentication

Figure 7:
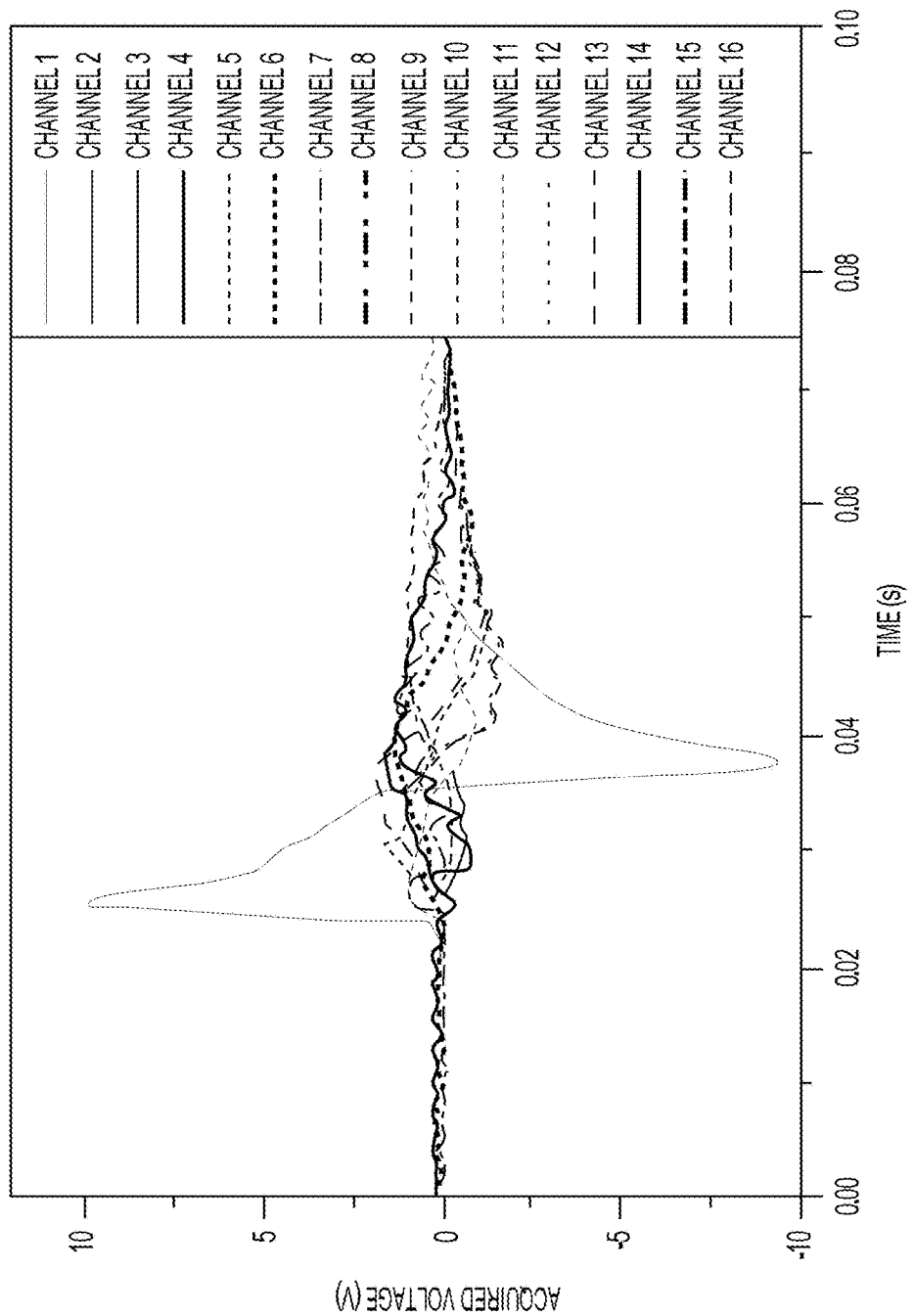
FIG. 7 illustrates output voltage signals of various channels when a key "T" was stroked.

The authentication system 200 may authenticate a user based on the user's typing content. When a key is pressed, or a keystroke occurs, its corresponding channel may output a relatively high output voltage. On the other hand, in the absence of the keystroke or when the key stays untouched, its corresponding output voltage remains zero. In practice, a low or negligible output voltage may be observed for untouched keys due to channel coupling. By way of example, as shown in FIG. 7, when the key "T" is pressed, its corresponding channel, e.g., channel 1, may output a relatively high voltage, e.g., a peak output voltage of about 10V, exceeding output voltages of untouched keys. As shown in FIG. 7, the output voltages of the untouched keys are less than 2.5V.

To detect a keystroke event on a key or to recognize a user's typing content, the processor 220 may, for each channel i, extract a maximum peak value of its output voltage $V_{pi}$, and compare $V_{pi}$ to a threshold voltage $V_{th}$. If $V_{pi}$ exceeds $V_{th}$, then the corresponding key may be deemed to have been pressed. Its associated character, e.g., character "T" in FIGS. 6-7, may be deemed as the user's input.

Figure 8:
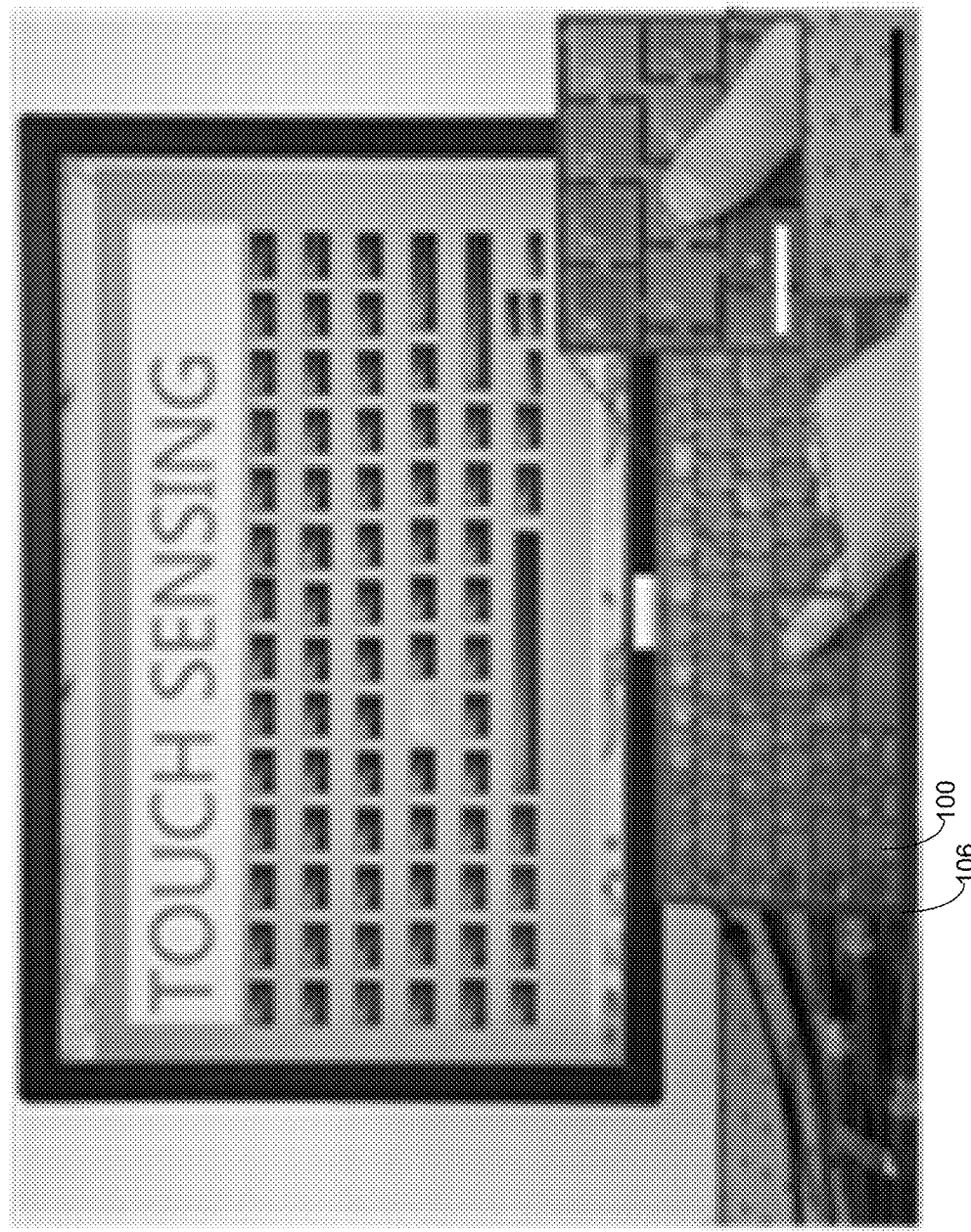
FIG. 8 illustrates continuously typing a string "TOUCH SENSING" on the keyboard according to one aspect of the disclosed technology.

Once the processor 220 detects a keystroke event, the processor 220 may instruct the storage medium 240 to record the character input. For instance, if the processor 220 recognizes that the key "T" is pressed, the storage medium 240 may record the character input "T" in real time without noticeable delay. In operation, when a user types a string of characters, the processor 220 and the storage medium 240 may recognize and store the string of characters. For instance, as illustrated in FIG. 8, when the user types a string "TOUCH SENSING" on the keyboard 100, the processor 220 and the storage medium 240 may instantaneously recognize and record the string input. The inset of FIG. 8 provides an enlarged view of the key "G" being pressed. In another example, as illustrated in FIGS. 9A-B, when the user types a string "GEORGIATECH365*", the processor 220 and the storage medium 240 may again instantaneously recognize and record the string input.

Based on the above recognition techniques, the authentication system 200 may authenticate a user by comparing the user's input to a password. The storage medium 240 may store the password. In the example as illustrated in FIG. 5, the user may be deemed legitimate and given access the resource 250, only if the user's input matches the password. If illegitimate attempts are made to access the resource 250, the authentication system 200 may trigger an alarm or report such potential security threats.

2.2.1.1 Threshold Voltage Determination

The processor 220 may calculate the threshold voltage $V_{th}$ by applying the Pauta Criterion Method. According to the Pauta Criterion Method, for a set of measured data $m_k$ with k>10, if $m_k$ meets the following criteria, then $m_k$ is deemed as a gross error that needs to be eliminated:

$$(\overline{m}-3\sigma) \le m_k \le (\overline{m}+3\sigma) \quad (1)$$

where $\overline{m}$ and $\sigma$ are the mean value and the standard deviation of the measured data, respectively.

At a keystroke event, a pressed key with a relatively high output voltage may be treated as the gross error, and may be identified as follows. Assuming $\overline{V}$ and $\sigma_0$ respectively are the mean value and the standard deviation of the extracted maximum peak value $V_{pi}$, the threshold voltage $V_{th}$ may be determined as follows $$V_{th} = \overline{V} + 3\sigma_0 \quad (2)$$

$$\overline{V} = \frac{1}{n}\sum_{i=1}^{n} V_{pi} \quad (3)$$

$$\sigma_0 = \sqrt{(V_{pi} - \overline{V})^2 / n} \quad (4)$$

n is the total number of channels, and i is an integer from 1 to n.

Substituting equations (3) and (4) into (2) gives:

$$V_{th} = \frac{1}{n}\sum_{i=1}^{n} V_{pi} + \frac{3}{\sqrt{n}}\sqrt{\sum_{i=1}^{n} V_{pi}(V_{pi}-1)} \quad (5)$$

The processor 220 may calculate the threshold voltage $V_{th}$ according to equation (5).

2.2.2 Typing Pattern Authentication

The authentication system 200 may authenticate a user based on the user's typing pattern or keystroke dynamics. As the user types on the keyboard 100, triboelectrification of the keyboard 100 may change dynamically. As a result, the output voltage and the output current may constantly change as the user types. Accordingly, a user's typing pattern may be obtained using quantifiable measurements the voltage and the current. The user's typing pattern may be manifested in the form such as variations in the output voltage or the output current.

Users each may have a distinct typing pattern due to their distinct biometrics, such as physical biometrics and behavioral biometrics. Relevant biometrics may include, but not limited to, manners and rhythms in keystrokes, typing habits, typing forces, typing speeds, finger dimensions and bioelectricities, among many other possibilities. Due to their distinct biometrics, when multiple users type the same string of characters, each user may demonstrate a unique typing pattern or have unique keystroke dynamics. For example, when one user types a string of characters, the output voltage may exhibit a variation pattern unique to that user. Similarly, the output current may also exhibit a variation pattern unique to that user. As such, by recognizing variations in the output voltage, the output current, or a combination thereof, the authentication system 200 may detect the user's biometrics, including the user's behavioral biometrics such as manners and rhythms of keystrokes and typing forces, among other possibilities.

The authentication system 200 may identify the user's typing pattern in the time domain, the frequency domain, or both. In one experiment, three typists each typed the word "touch" for more than four times on the keyboard 100 according to his/her accustomed manner. FIGS. 10A-C illustrate the three typists' respective typing patterns in the time domain. For instance, FIG. 10A illustrates variations of the first typist's output voltage and output current in the time domain. FIG. 10B illustrates variations of the second typist's output voltage and output current in the time domain. FIG. 10C illustrates variations of the third typist's output voltage and output current in the time domain. As shown in FIGS. 10A-C, each typist has a distinct typing pattern.

Figure 11A:
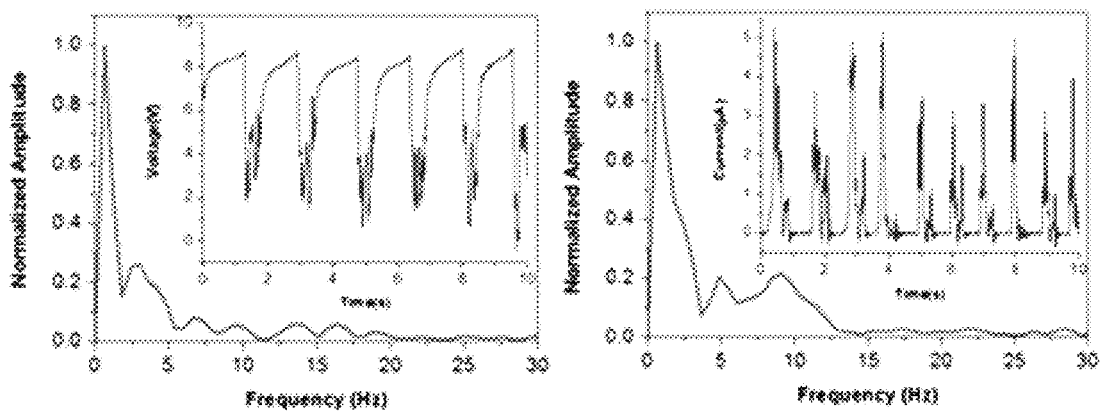
FIGS. 11A-C respectively illustrate frequency spectra of signals of FIGS. 10A-C according to one aspect of the disclosed technology.
Figure 11B:
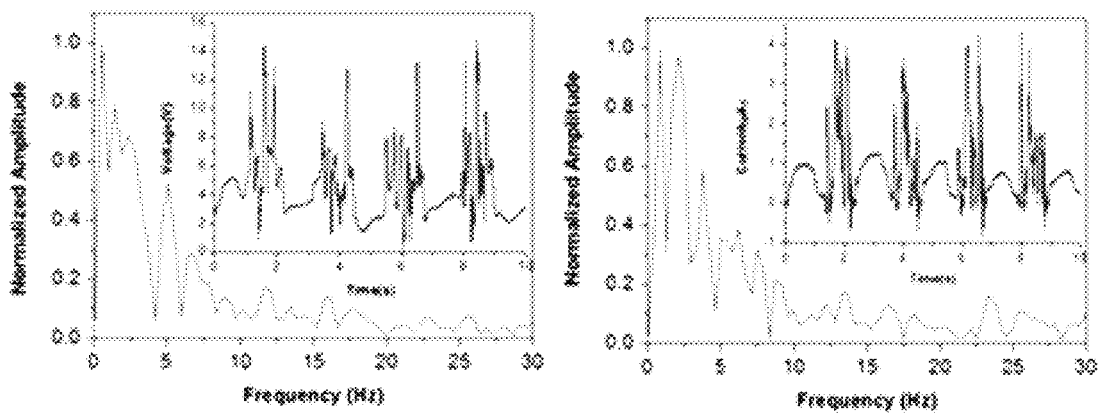
Figure 11C:
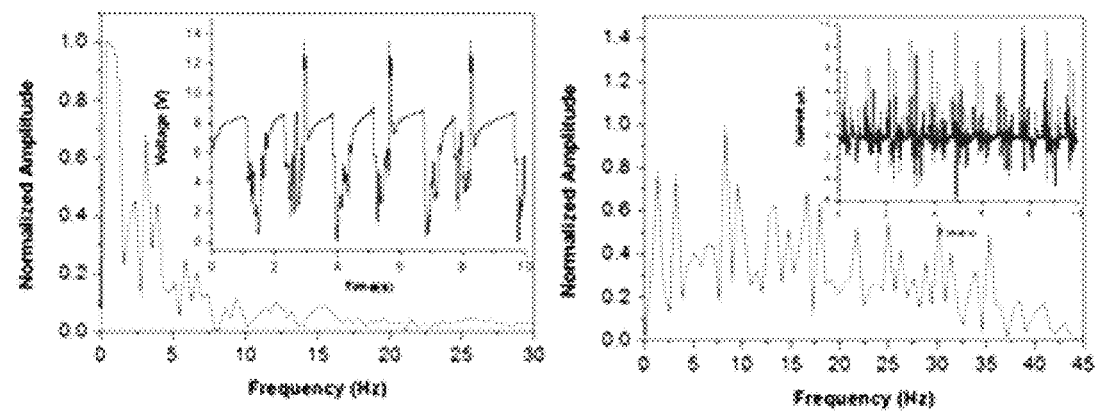

The processor 220 may perform Discrete Fourier Transformation (DFT) to obtain frequency features of the output voltage and the output current for each typist. FIGS. 11A-C illustrate the three typists' respective typing patterns in the frequency domain. FIG. 11A illustrates the first typist's output voltage and output current in the frequency domain. FIG. 11B illustrates the second typist's output voltage and output current in the frequency domain. FIG. 11C illustrates the third typist's output voltage and output current in the frequency domain. The inset in each figure illustrates each typist's typing pattern in the time domain. As shown in FIGS. 11A-C, each typist has a distinct voltage frequency spectrum and a distinct current spectrum in terms of position and amplitude of major signal components. Amplitudes of some major signal components are characterized in Table 2.

TABLE 2

Major components of frequency spectra of typing patterns

| | First Typist | Second Typist | Third Typist |
|---|---|---|---|
| Voltage Data | [0.4, 4, 6.2, 8.7] | [0.41, 1.25, 3, 5, 6.6, 9] | [1.25, 2.5, 3.3, 7.5] |
| Current Data | [1.25, 2.1, 3.3, 4.2, 9.6] | [0.81, 2.1, 3.75, 5, 6.2, 7.5, 8.75] | [1.2, 3.3, 4.6, 5.4, 7.9, 9.2] |

In one embodiment, the processor 220 may perform a wavelet transformation to obtain both time domain and frequency domain features of the typing pattern. The wavelet transformation may include, but not limited to, Daubechies Wavelet of order 4 (DB4). By applying DB4, the typing pattern may be determined by a multi-resolution analysis using the following equations:

$$f(t) = S_4(t) + D_4(t) + D_3(t) + D_2(t) + D_1(t) \quad (6)$$

where $$S_4 = \Sigma_k s_{4,k} \varphi_{4,k}(t) \quad (7)$$

$$D_j = \Sigma_k d_{j,k} \psi_{j,k}(t) \quad (8)$$

In the above equations, $S_{4,k}$ and $d_{j,k}$ are wavelet coefficients. $j=1, 2, 3, 4$. $k$ is the number of translations of the wavelet for any given scale. $\varphi_{4,k}(t)$ and $\psi_{j,k}(t)$ are respectively father and mother wavelets. $f(t)$ represents either the voltage signal or the current signal of the typing pattern. $S_4$ is smooth. Wavelet details $D_4$, $D_3$, $D_2$, and $D_1$ represent a set of voltage or current components that provide representations of original signals at different resolution levels.

Figure 12A:
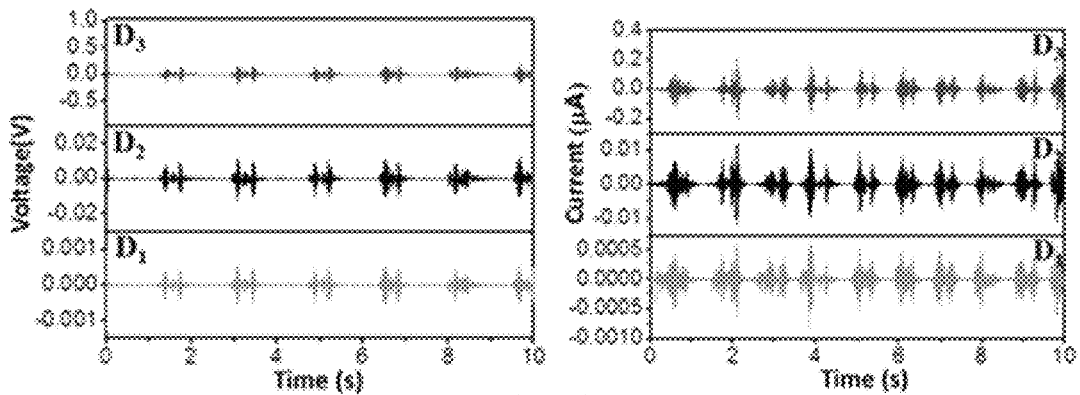
FIGS. 12A-C respectively illustrate higher resolution terms $D_3$, $D_2$ and $D_1$ of signals of FIGS. 10A-C after the DB4 transformation.
Figure 12B:
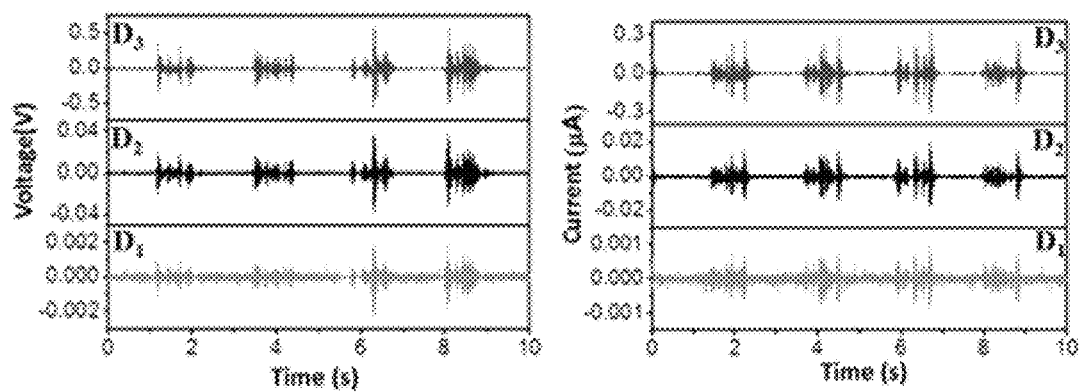
Figure 12C:
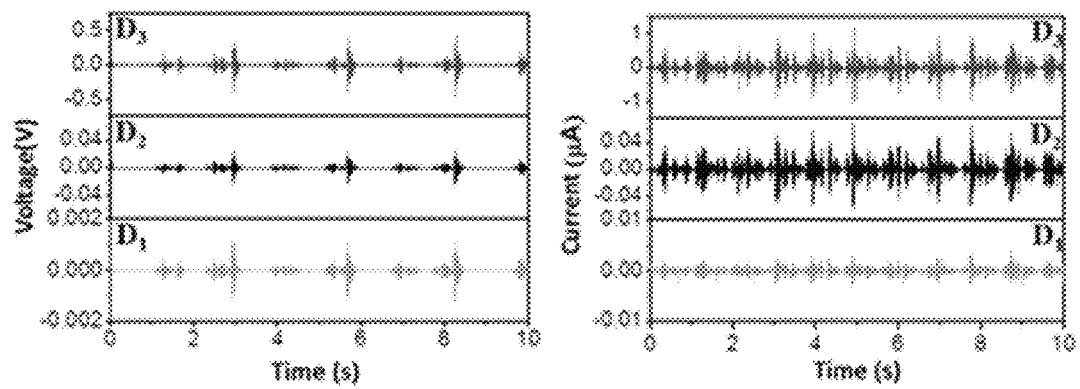

FIGS. 10A-C illustrate $S_4$ and $D_4$ as determined for each typist. FIGS. 12A-C provide higher resolution terms $D_3$, $D_2$, and $D_1$ for the three typists. For example, FIG. 12A illustrates higher resolution terms for the first typist. FIG. 12B illustrates higher resolution terms for the second typist. FIG. 12C illustrates higher resolution terms for the third typist. As shown in these figures, each typist has a unique set of higher resolution wavelet components.

The processor 220 may use DB4 as a behavioral biometric identifier to classify and identify each typing pattern. In one embodiment, the processor 220 may calculate a Pearson correlation coefficient to quantitatively measure a correlation between the wavelet components according to the following equation:

$$\gamma = \frac{\sum_{i=1}^{n}(t_i - \bar{t})(x_i - \bar{x})}{\sqrt{\sum_{i=1}^{n}(t_i - \bar{t})^2} \sqrt{\sum_{i=1}^{n}(x_i - \bar{x})^2}} \quad (9)$$

where n is the length of the data sequence to be compared, and x is either the voltage sequence or the current sequence after DB4. Tables 3a-b provide exemplary Pearson correlation coefficients of $D_4$ and $S_4$ components for the three typists.

TABLE 3a

Pearson Correlation Coefficients Between the Wavelet Components of the Output Voltage

| | First Typist | | Second Typist | | Third Typist | |
|---|---|---|---|---|---|---|
| Voltage | $S_4$ | $D_4$ | $S_4$ | $D_4$ | $S_4$ | $D_4$ |
| First Typist | 0.91 | 0.92 | 0.43 | 0.45 | 0.45 | 0.43 |
| Second Typist | 0.43 | 0.45 | 0.86 | 0.87 | 0.42 | 0.34 |
| Third Typist | 0.45 | 0.43 | 0.42 | 0.34 | 0.88 | 0.89 |

TABLE 3b

Pearson Correlation Coefficients Between the Wavelet Components of the Output Current

| | First Typist | | Second Typist | | Third Typist | |
|---|---|---|---|---|---|---|
| Current | $S_4$ | $D_4$ | $S_4$ | $D_4$ | $S_4$ | $D_4$ |
| First Typist | 0.92 | 0.89 | 0.44 | 0.41 | 0.42 | 0.39 |
| Second Typist | 0.42 | 0.41 | 0.85 | 0.85 | 0.36 | 0.35 |
| Third Typist | 0.42 | 0.39 | 0.36 | 0.35 | 0.88 | 0.89 |

The Pearson correlation coefficient may express uniqueness and permanence among individual typing patterns. As shown in Tables 3a-b, all of the Pearson correlation coefficients of the voltage or current components from each individual are larger than 0.85, suggesting a superior repeatability or permanence of the typing patterns, while other Pearson correlation coefficients are less than 0.45 that is indicative of excellent uniqueness of the typing patterns among individuals.

Based on the above typing pattern recognition techniques, the authentication system 200 may authenticate a user by comparing the user's typing pattern to a threshold, predetermined or legitimate typing pattern. The storage medium 240 may store the predetermined legitimate typing pattern. In one embodiment, the authentication system 200 may validate a user by first calculating the user's Pearson correlation coefficient, and compare the calculated correlation coefficient to a threshold or a predetermined correlation coefficient. The storage medium 240 may store the threshold or the predetermined correlation coefficient. In the example as illustrated in FIG. 5, the user may be deemed legitimate and given access the resource 250, only if the user's correlation coefficient matches or approximates the predetermined correlation coefficient. If illegitimate attempts are made to access the resource 250, the authentication system 200 may trigger an alarm or report such potential security threats.

In another example, to validate a user, the authentication system 200 may validate the user based on both typing content recognition and typing pattern recognition. For example, the authentication system 200 may validate the user's string input as well as the user's typing pattern, and grant access to the user only if both conditions are met: (1) the user's string input matches a threshold character string, and (2) the user's typing pattern matches a threshold typing pattern.

2.3 Performance

To evaluate performance of the authentication system 200, 104 individuals were invited to an experiment, where each individual typed the word "touch" for more than four times on the keyboard 100 according to his/her accustomed manner. The 104 individuals were randomly selected, and had diverse demographics of age, gender and ethnicity. In the experiment, the individuals had an age span from 14 to 69 years. 52 individuals represented valid users, whereas the other 52 individuals represented impostors. For each individual, the authentication system 200 determined his/her typing pattern and corresponding $D_4$ and $S_4$ components. 104 unique sets of typing patterns were obtained.

Figure 13:
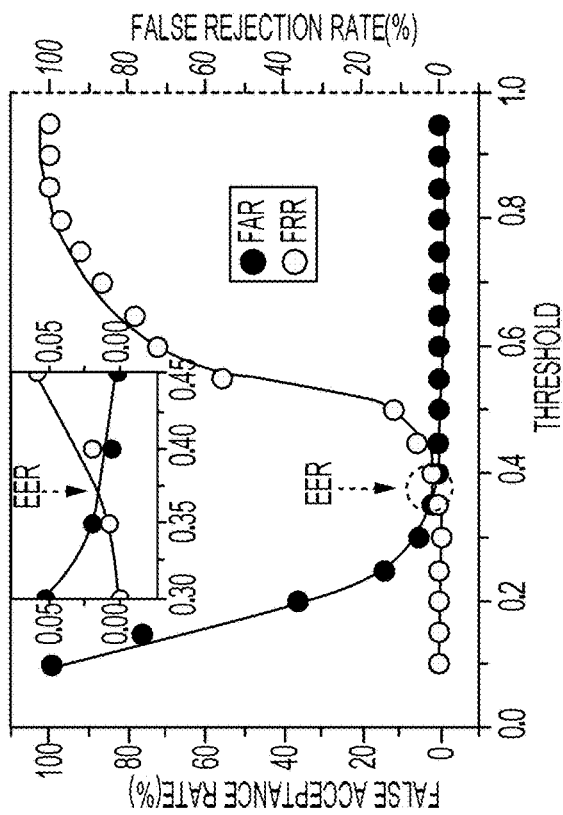
FIG. 13 illustrates variations of false acceptance rate and false rejection rate of the authentication system relative to a threshold according to one aspect of the disclosed technology.

The performance of the authentication system 200 may be analyzed based on two error rates: False Rejection Rate (FRR) and False Acceptance Rate (FAR). FRR and FAR may vary depending on a classification threshold. FIG. 13 illustrates variations of FAR and FRR in relation to the threshold. FRR and FAR may trade off against each other by tuning the classification threshold to achieve a preferable classification result. In the experiment, the Pearson correlation coefficient was selected as the classification threshold.

As shown in FIG. 13, FRR increases as the threshold increases, while FAR follows a reverse trend. FRR and FAR intersects when the threshold is 0.37. The intersection point may be referred to as Equal Error Rate. The inset of FIG. 13 provides an enlarged view of the EER point. As clearly shown in FIG. 13, the authentication system 200 has a remarkably low EER value of 1.34% when the threshold is 0.37.

Figure 14:
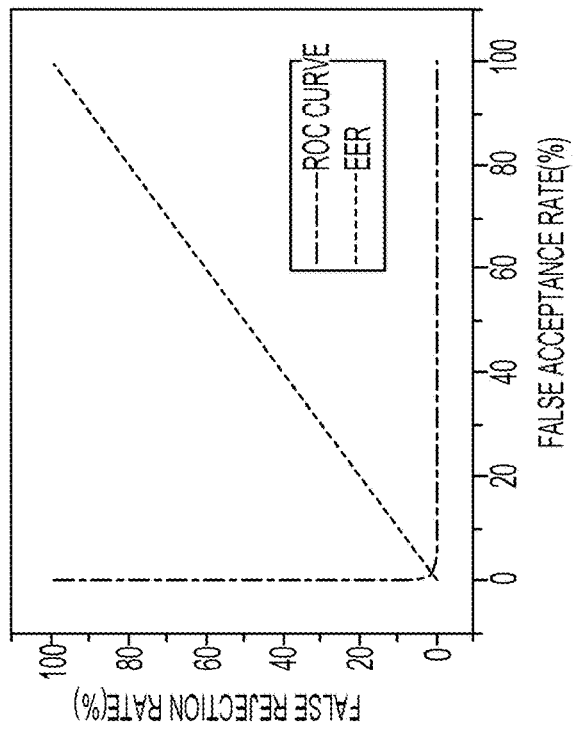
FIG. 14 illustrates a receiver operating characteristic of the authentication system according to one aspect of the disclosed technology.

FIG. 14 illustrates a receiver operating characteristic (ROC) curve of the authentication system 200, showing FRR as a function of FAR.

2.4 Other Embodiments

Figure 15:
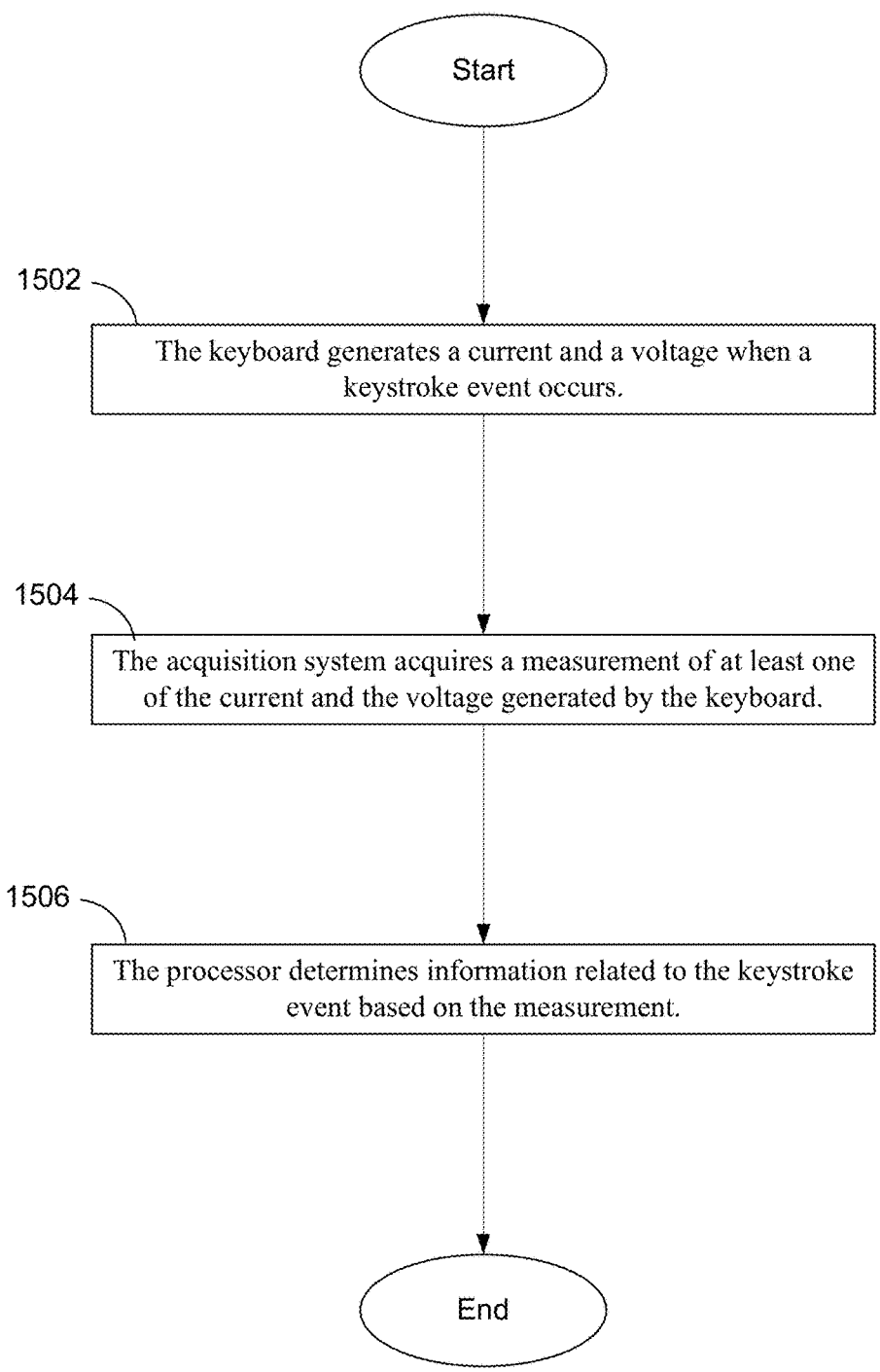
FIG. 15 is a flow diagram of a method according to one aspect of the disclosed technology.

In one embodiment, the keyboard 100, the acquisition system 210 and the processor 220 may together form a system for determining information related to a keystroke event. FIG. 15 provides a flow-diagram of an example method, in accordance with an exemplary embodiment of the disclosed technology. In block 1502, the keyboard 100 may generate a current and a voltage when a keystroke event occurs. In block 1504, the acquisition system 210 may acquire a measurement of at least one of the current and the voltage generated by the keyboard 100. In block 1506, the processor 220 may determine information related to the keystroke event based on the measurement.

In one example, the information related to the keystroke event may include an input character associated with the keystroke event. In another example, the information related to the keystroke event may include a behavioral biometric of a user that performs the keystroke event. In one example, the information related to the keystroke event may include a typing pattern of a user that performs the keystroke event. In another example, the information related to the keystroke event may include at least one of the following: keystroke manner, keystroke rhythm, typing habit, typing force, typing speed, finger dimension and bioelectricity.

The processor 220 may perform at least one of a frequency-domain transformation and a wavelet transformation on the measurement acquired by the acquisition system to determine a typing pattern. The processor 220 may compare the determined typing pattern to a predetermined typing pattern to authenticate a user that performs the keystroke event. For example, the processor 220 may calculate a Pearson correlation coefficient based on the measurement acquired by the acquisition system, and compare the Pearson correlation coefficient to a threshold to authenticate the user that performs the keystroke event. In another example, the processor 220 may determine a string of characters from a plurality of keystroke events performed by the user, and compare the string of characters to a predetermined character string to authenticate the user.

3. Alarming System

Figure 16B:
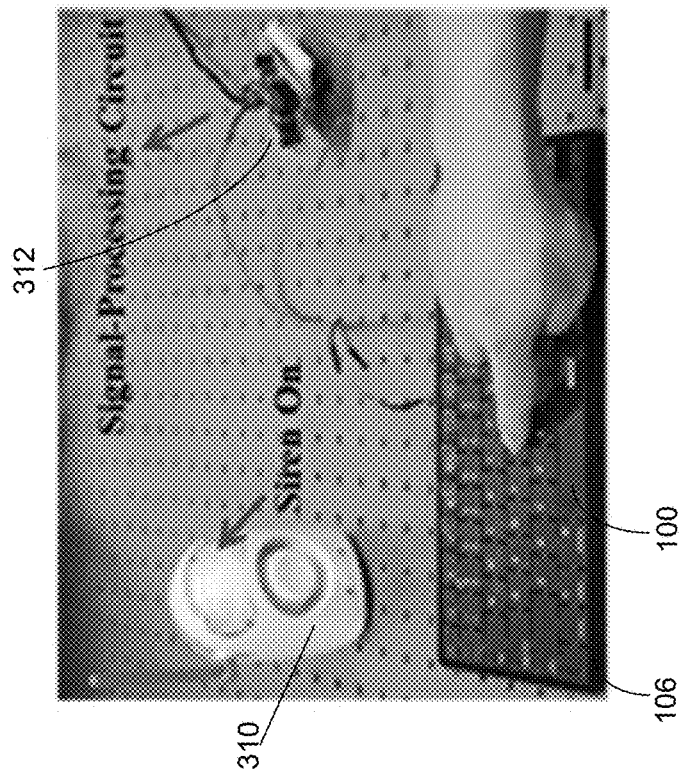
FIG. 16B illustrates the alarming system of FIG. 16A in operation according to one aspect of the disclosed technology.
Figure 16A:
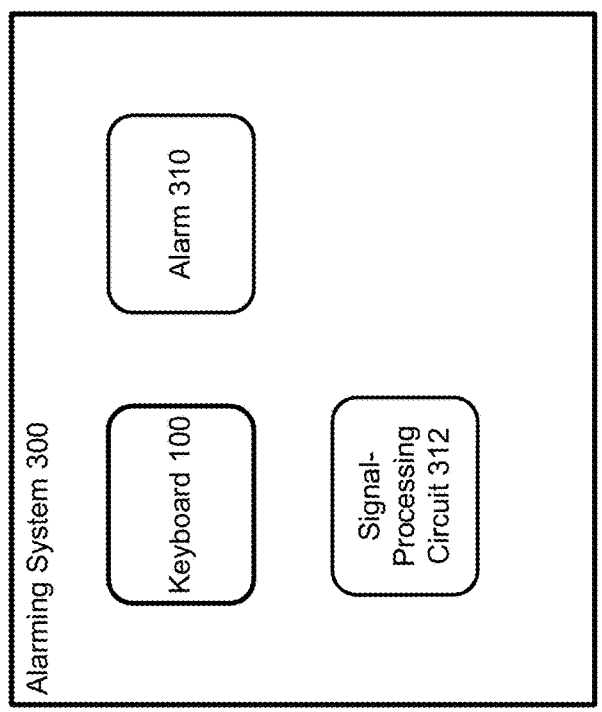
FIG. 16A provides a block diagram of an alarming system according to one aspect of the disclosed technology.

In one aspect of the disclosed technology, the keyboard 100 may serve as part of an alarming system 300 as illustrated in FIGS. 16A-B. In addition to the keyboard 100, the alarming system 300 may include an alarm 310 and a signal processing circuit 312. The signal processing circuit 312 may turn the alarm 310 on and off. Once turned on, the alarm 312 may produce a sound, display a flashing light, or a combination thereof. In FIG. 16B, the scale bar may be 5 cm.

Figure 17:
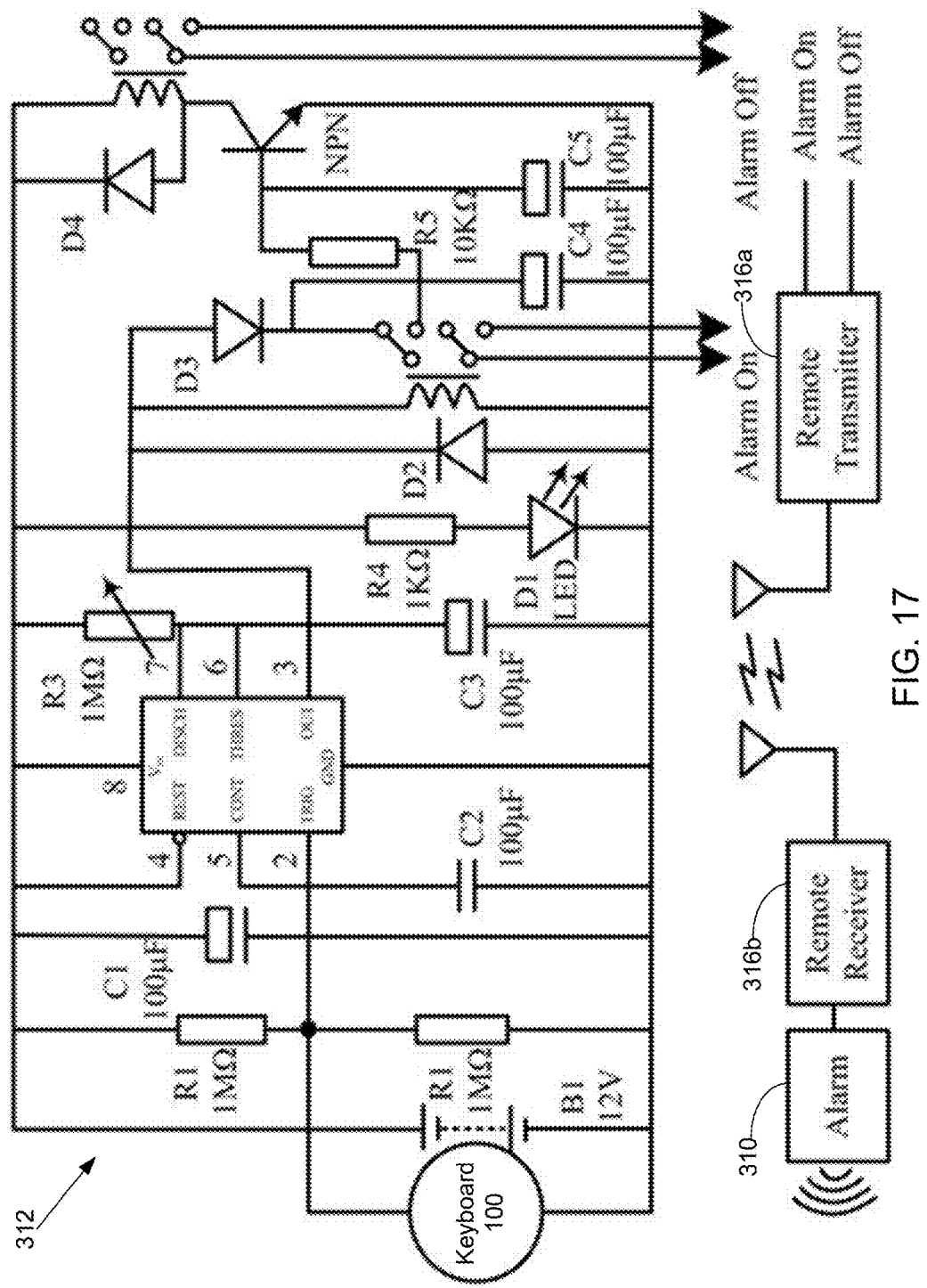
FIG. 17 provides a circuit diagram of the alarming system of FIG. 16A according to one aspect of the disclosed technology.

FIG. 17 provides a circuit diagram of the alarming system 300. The signal processing circuit 312 may control the alarm 310 wirelessly. For instance, the signal processing circuit 312 may be coupled to a wireless transmitter 316a. The alarm 310 may be coupled to a wireless receiver 316b forming a wireless alarm. The signal processing circuit 312 may include an IC timer to control the wireless transmitter 316a, which, in turn, may remotely switch the alarm 310 on and off between a panic state and a silence state.

In one embodiment, the alarming system 300 may be touch-sensitive. For example, the alarm 310 may be set off whenever a finger gently taps on a key 104. When the finger gently strokes a key, a voltage signal may be generated. If the generated voltage exceeds a trigger voltage threshold, the alarm 310 may be triggered. In one embodiment, the trigger voltage threshold may be set to a value that allows the keyboard 100 to work stably even in a high electrical noise environment. For instance, the trigger voltage threshold may be set to 5V.

Figure 18:
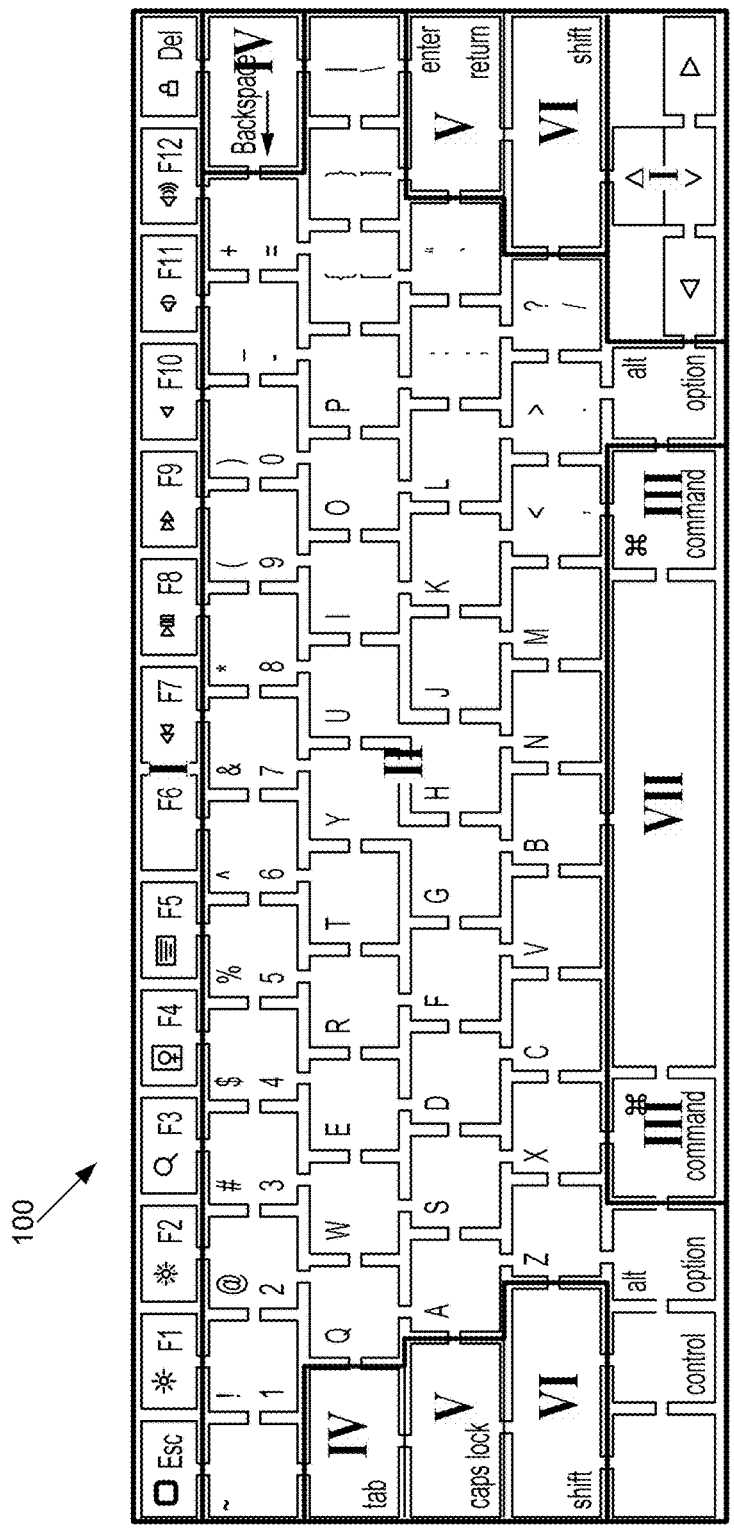
FIG. 18 illustrates a classification of the keyboard by key dimension according to one aspect of the disclosed technology.
Figure 19A:
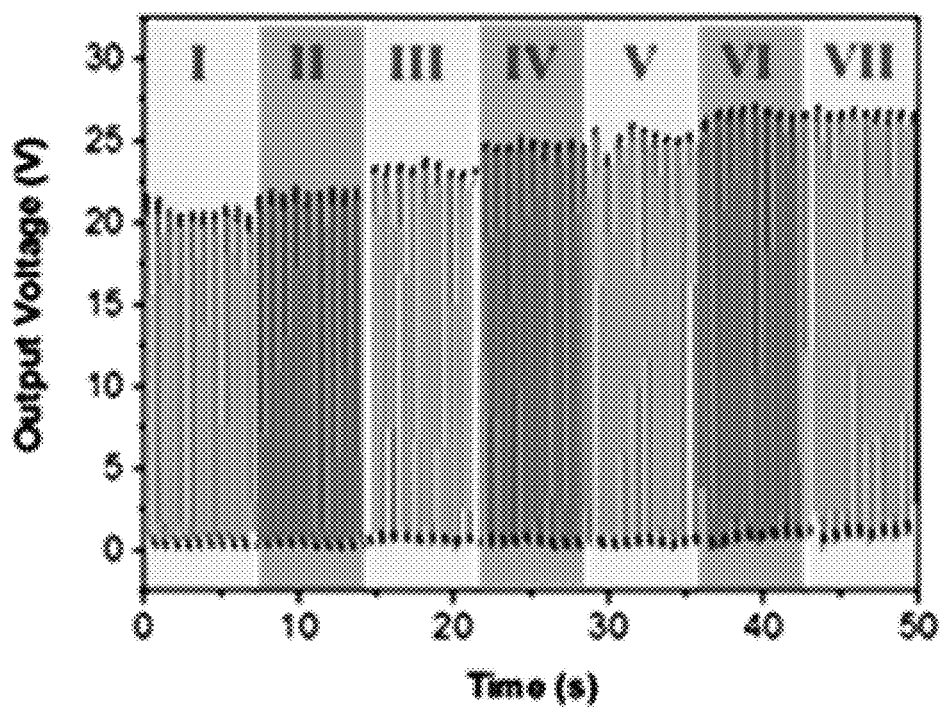
FIG. 19A illustrates output voltages obtained from various key regions according to one aspect of the disclosed technology.
Figure 19B:
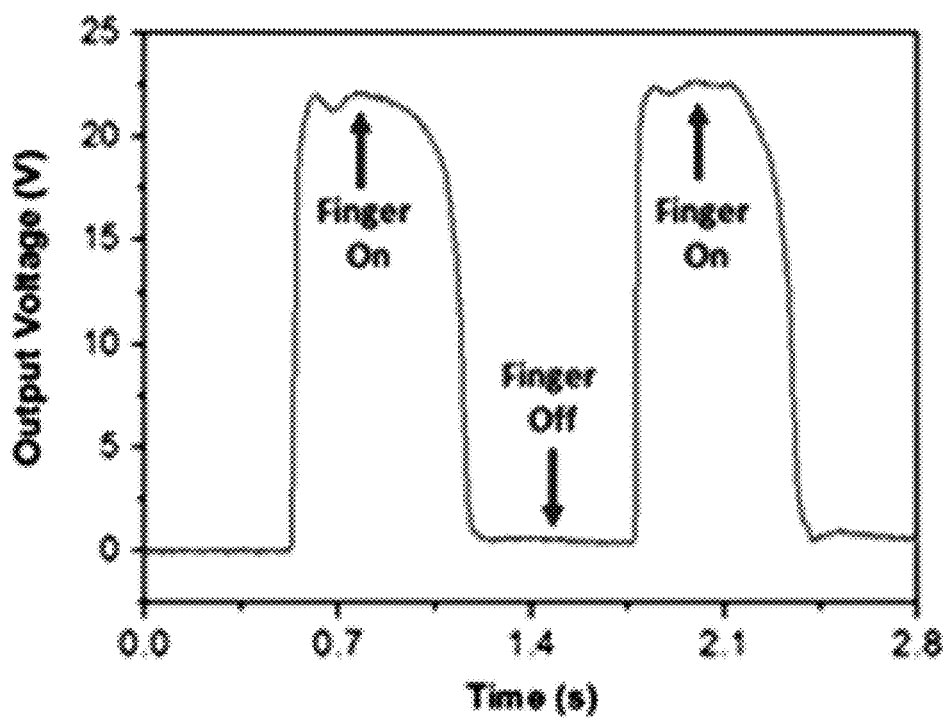
FIG. 19B provides an enlarged view of the output voltage generated by a smallest key at a keystroke event.

In one aspect, the keys 104 in the keyboard 100 may be categorized into seven regions according to their dimensions, as shown in FIG. 18, where keys of the same dimension are categorized into the same region. FIG. 19A illustrates the output voltages of the keys from different regions when they are pressed. According to FIG. 19A, the larger the key, the greater the triboelectric charges and the higher the output voltage. FIG. 19B provides an enlarged view of the output voltage of a smallest key at a gentle keystroke event. As shown in FIGS. 19A-B, even a keystroke event at the smallest key may set off the alarm 310, assuming the trigger voltage threshold is at 5V.

In another embodiment, the alarming system 300 may be coupled to the authentication system 200 so as to set off the alarm when a security threat is detected, e.g., when an impostor attempts to access the resource 250.

4. Power Generation System

4.1 Structure

Figure 20:
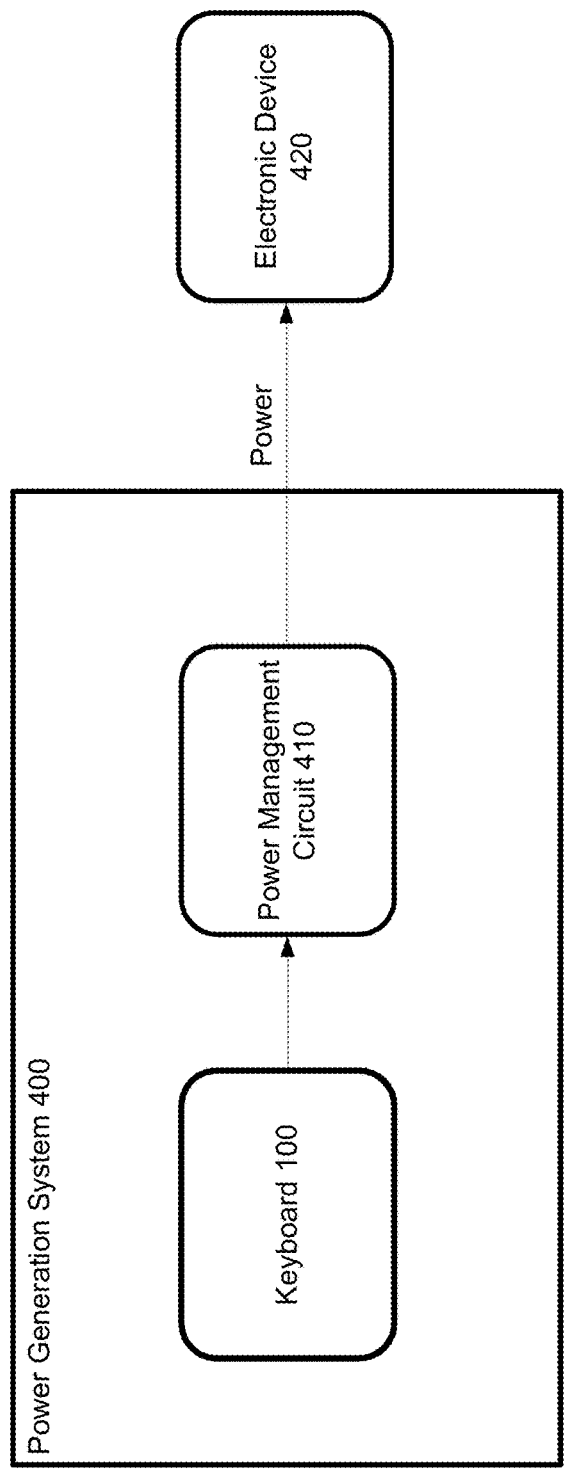
FIG. 20 provides a block diagram of a power generation system according to one aspect of the disclosed technology.

According to one aspect of the disclosed technology, the keyboard 100 may serve as part of a power generation system 400 as illustrated in FIG. 20. In addition to the keyboard 100, the power generation system 400 may include a power management circuit 410. The power management circuit 410 may receive a current output by the keyboard 100 and output a current to charge a rechargeable energy storage unit or an electronic device 420. The rechargeable energy storage unit may include at least one of a rechargeable battery and a capacitor, among many other possibilities. The electronic device 420 may be a battery-operated system, such as a remote control, a wireless keyboard or a wireless mouse, among many other possibilities. The power management circuit 410 may include, but not limited to, at least one of the following: a rectifier, an integrated power control circuit and a transformer, among many other possibilities.

The keyboard 100 may harness mechanical energy, e.g., typing motions, to generate electricity. As a result, the keyboard 100 may charge the rechargeable energy storage unit or the electronic device 420. In the alternative, the keyboard 100 may be self-powered.

4.2 Performance

To evaluate performance of the keyboard 100 in harvesting typing energy, the keyboard 100 was tested in two typing modes: intermittent and continuous typing modes. In the intermittent mode, a commonly used key, e.g., a key from zone II (see FIG. 18 for key classification), was repeatedly pressed. FIGS. 21A-E illustrate performance characteristics in the intermittent typing mode.

Figure 21A:
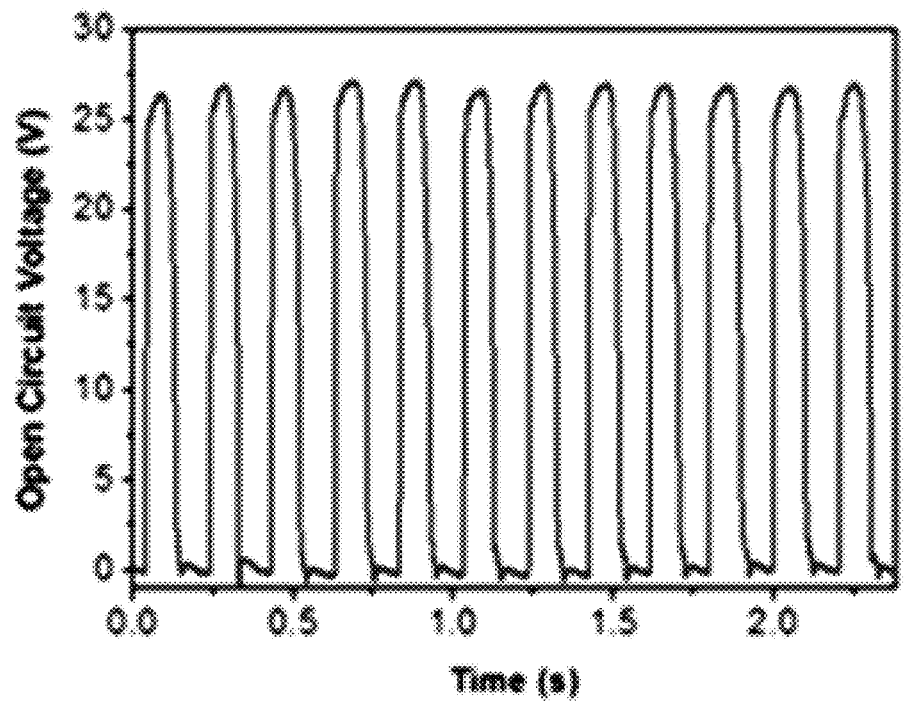
FIG. 21A illustrates the open-circuit voltage of the keyboard in an intermittent typing mode according to one aspect of the disclosed technology.
Figure 21B:
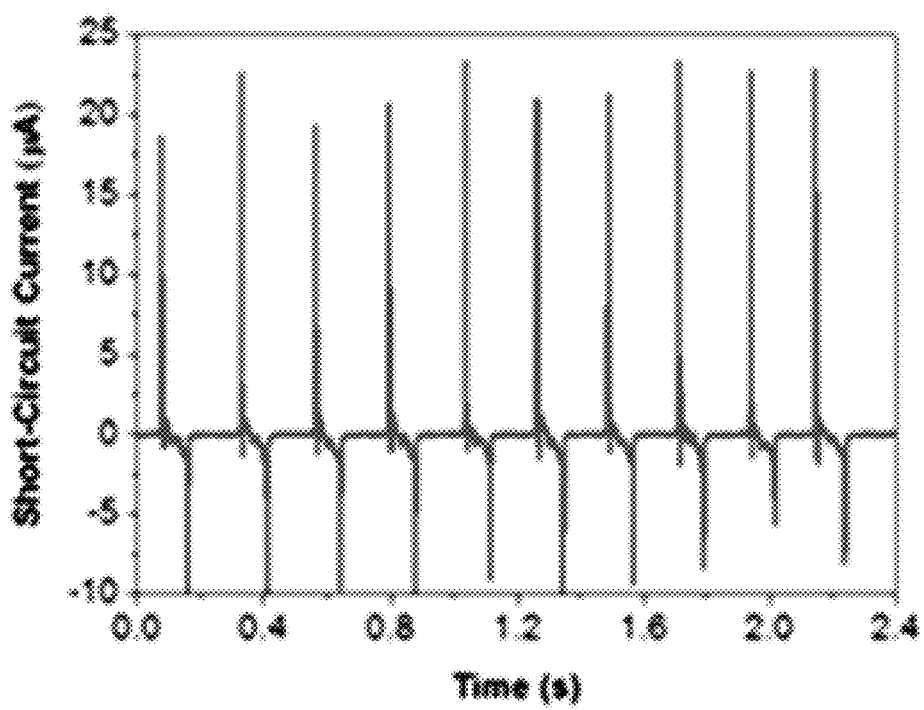
FIG. 21B illustrates the short-circuit current of the keyboard in the intermittent typing mode according to one aspect of the disclosed technology.

FIGS. 21A-B illustrate the open-circuit voltage and the short-circuit current obtained in the intermittent typing mode. As shown in these figures, a peak output voltage of 26.8V and a peak output current of 23.5 µA are achieved. As shown in FIG. 21B, the output current is asymmetric. The larger positive peaks may correspond to points in time when the key is pressed, whereas the smaller peaks may correspond to points in time when the key is released. When a total amount of transportable charges remains the same, quick pressing events result in higher current peaks than slow releasing events.

Figure 21C:
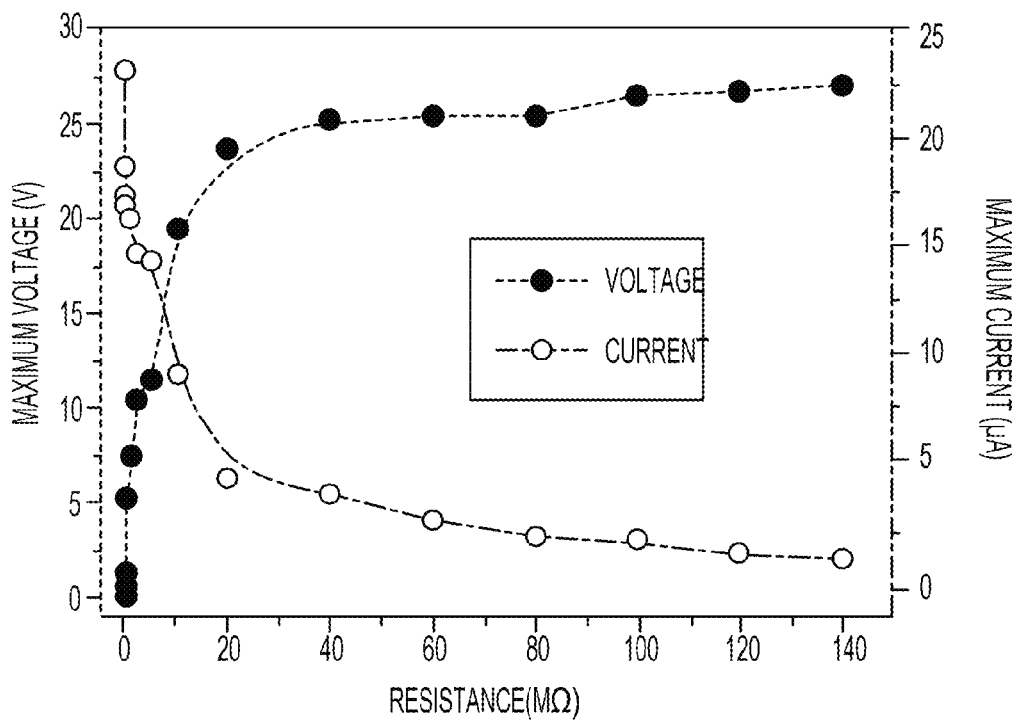
FIG. 21C illustrates how an external load resistance affects the output voltage and the output current according to one aspect of the disclosed technology.
Figure 21D:
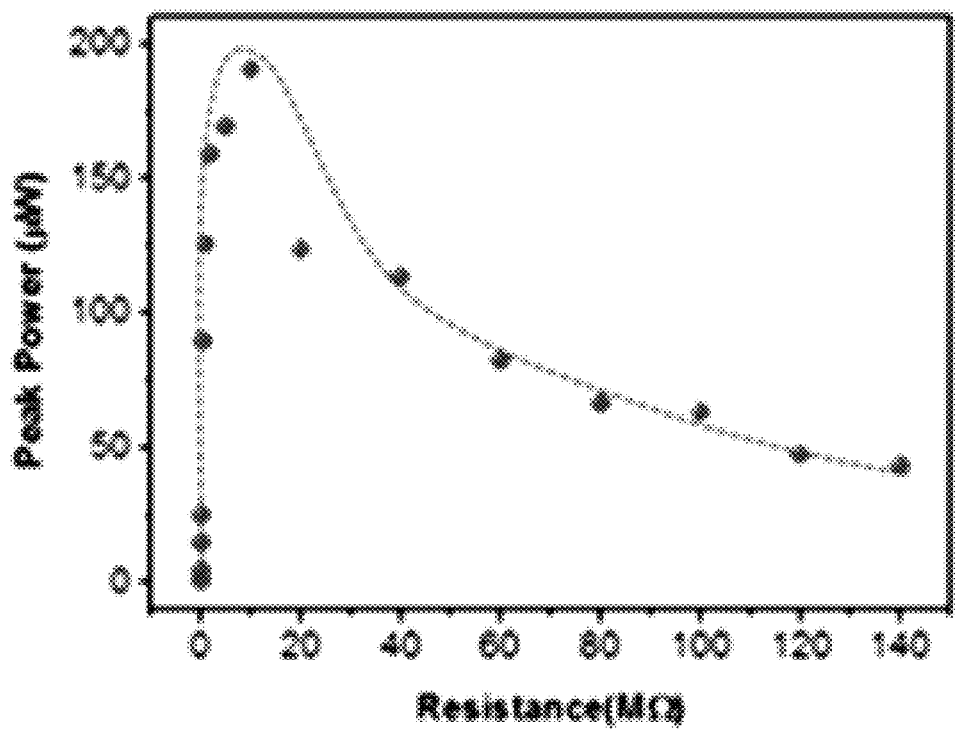
FIG. 21D illustrates how an external load resistance affects the peak power output according to one aspect of the disclosed technology.

FIGS. 21C-D illustrate how a resistor as an external load affects the output power of the keyboard 100. FIG. 21C illustrates that the output voltage and the output current depend on the external load resistance, where points in the graph represent peak values of electrical signals while lines represent fitted results. As shown in FIG. 21C, as the resistance increases, the current drops in magnitude, but the voltage increases in magnitude.

FIG. 21D illustrates that the peak output power depends on the external load resistance. As shown in FIG. 21D, a maximum output power occurs when R=9 MΩ. The maximum output power corresponds to a peak power density of 69.6 µW cm$^{-2}$ and a peak specific power of 2.05 mW g$^{-1}$. With an area power density of 69.6 µW cm$^{-2}$, the keyboard 100 may charge small electronics at an arbitrary typing speed greater than 100 characters per min (CPM). This output performance is at least 141 times better than that previously reported.

Figure 21E:
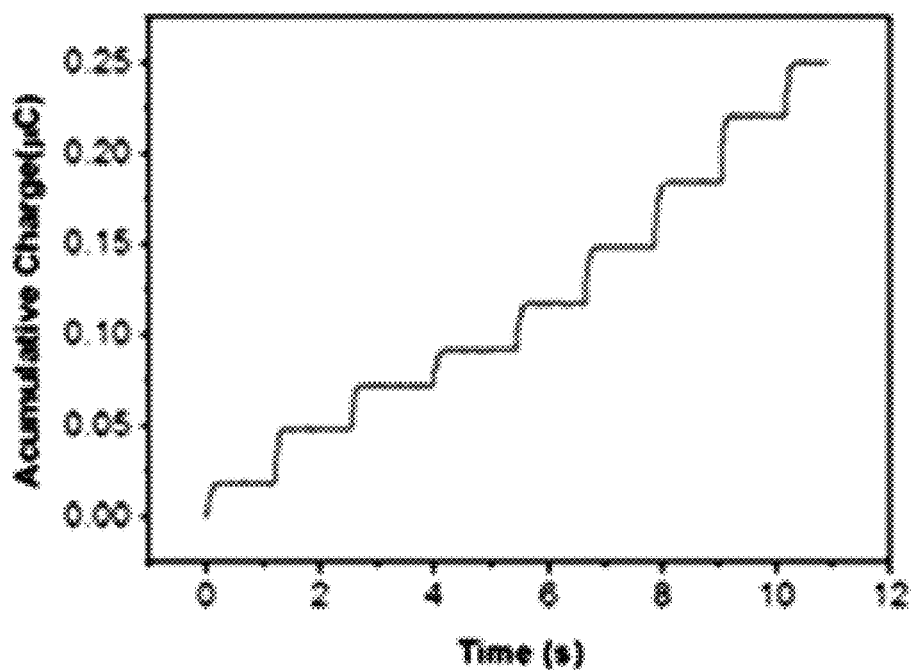
FIG. 21E illustrates accumulative induced charges generated by the keyboard over time according to one aspect of the disclosed technology.

FIG. 21E illustrates total accumulative induced charges generated by the keyboard 100. Measurements are obtained by using a diode bridge. Each step in FIG. 21E may represent an output current resulted from a keystroke event. On average, 37 nC of induced charges are produced. The area density of triboelectric charges is calculated as 134 µC m$^{-2}$.

Figure 21F:
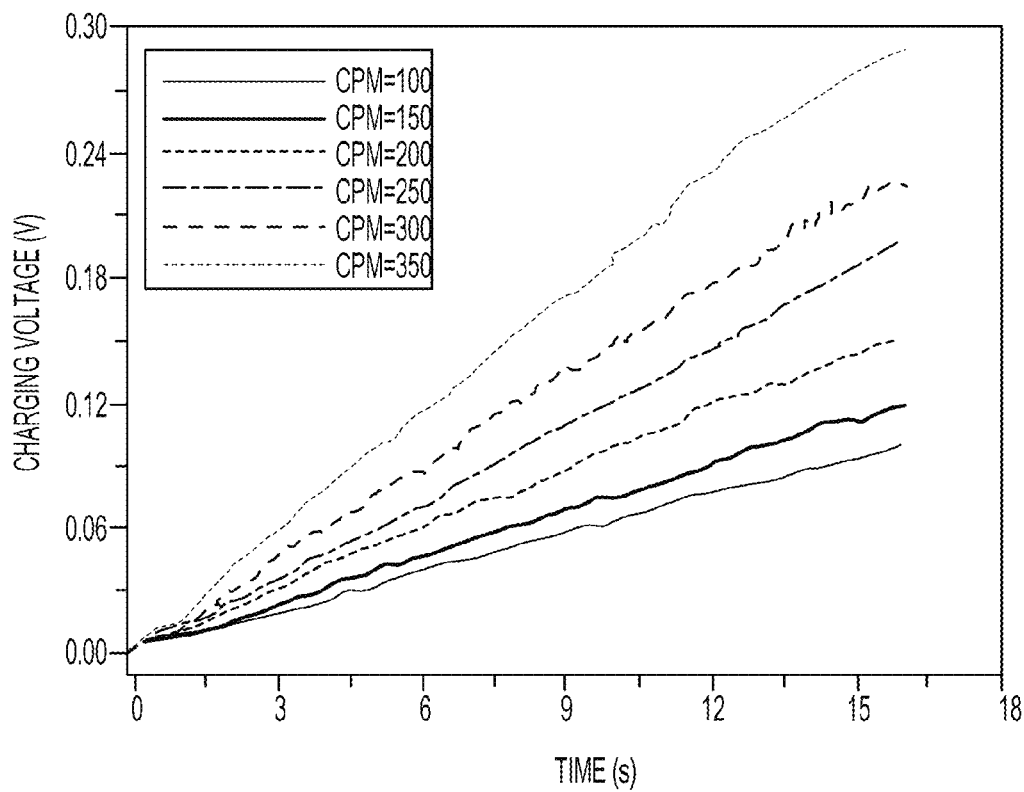
FIG. 21F illustrates charging voltages at various typing speeds according to one aspect of the disclosed technology.
Figure 21G:
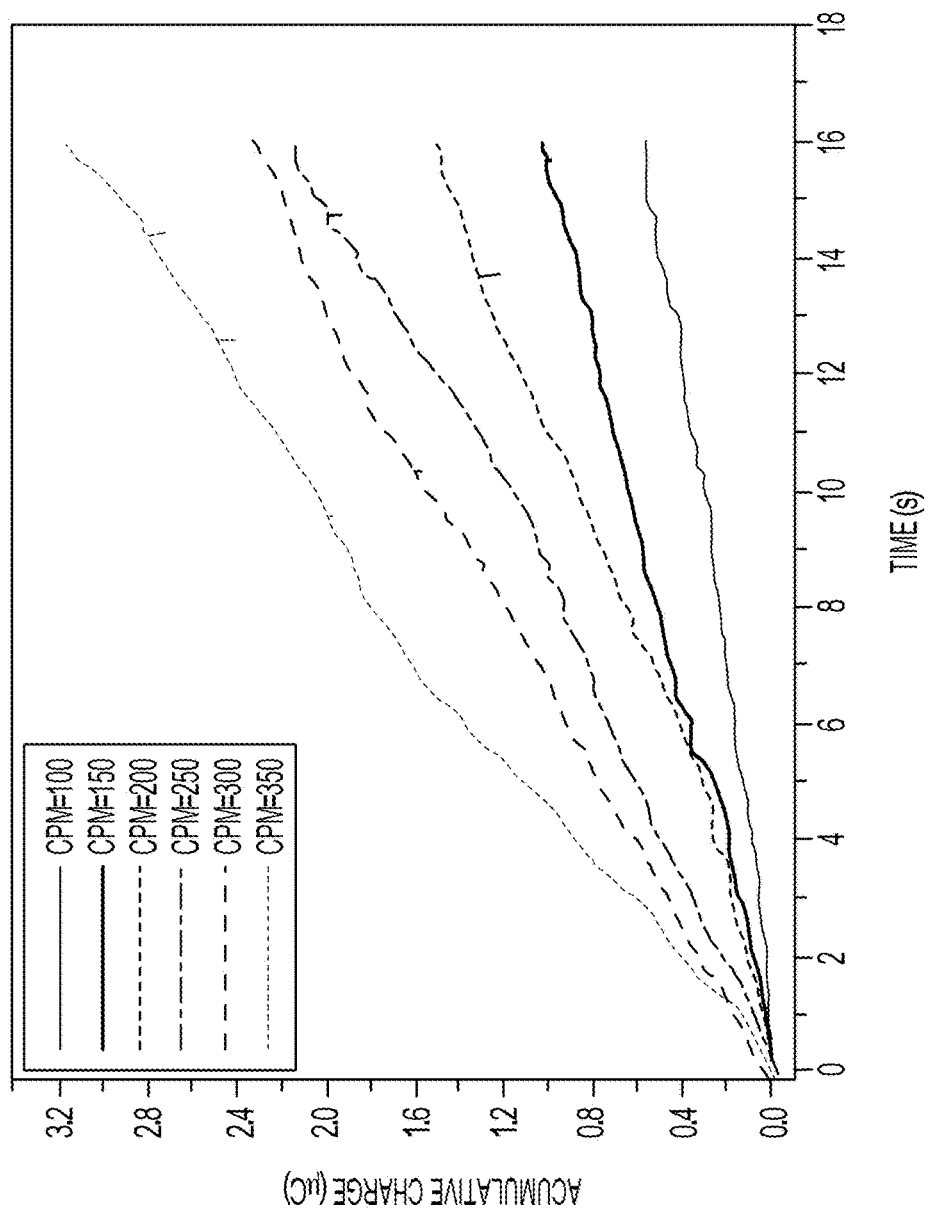
FIG. 21G illustrates accumulative triboelectric charges generated by the keyboard in a continuous typing mode according to one aspect of the disclosed technology.

FIGS. 21F-G illustrate performance characteristics obtained in the continuous typing mode. Users mostly use the continuous typing mode in daily life. As demonstrated in FIG. 21F, the keyboard 100 can effectively harvest typing energy at a wide range of typing speeds. The wide range of typing speeds virtually covers all typing scenarios in daily life. As shown in FIG. 21F, there is a direct proportional relationship between the typing speed and the charging rate.

FIG. 21G illustrates accumulative triboelectric charges generated by the keyboard 100 in the continuous typing work mode. There is a direct proportional relationship between the typing speed and the charge accumulative rate. The faster the typing, the faster the triboelectric charge generation and the higher the charging rate. At a moderate typing speed of 350 CPM, a charging rate of 0.019V s$^{-1}$ may be achieved for a commercial capacitor.

In one embodiment, the typing force applied by a keystroke may be measured by a dual-range force sensor. The output voltage of the keyboard 100 may be measured by a voltage preamplifier. The output current of the keyboard 100 may be measured by a low-noise current preamplifier.

5. Nanostructure

Figure 22A:
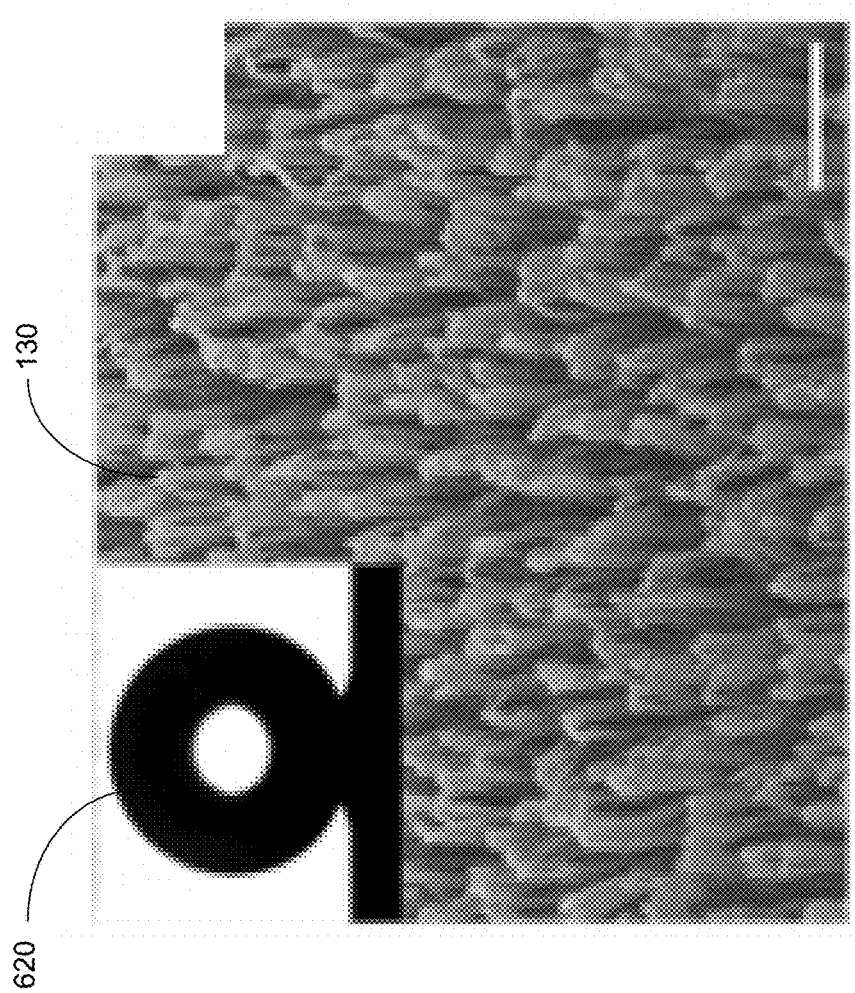
FIG. 22A provides a scanning electron microscope (SEM) image of the keyboard surface with nanowires disposed thereon, and an inset illustrating the contour of a resting droplet for surface static contact angle measurement.

According to one aspect of the disclosed technology, the keyboard 100 may include a plurality of nanostructures on its surface, e.g., the layer 110. The inset of FIG. 2 provides an enlarged exemplary schematic illustration of nanostructures 130 on the layer 110. The nanostructures 130 may have elastic properties. The nanostructures 130 may be in the form of nanowires. In one example, the nanowires may be made of the same material as the layer 110. For instance, the nanowires and the layer 110 may be made of FEP. FIG. 22A provides an SEM image of vertically aligned nanowires 130. The nanowires 130 may have an average clustering diameter of 104±21 nm and an average length of 0.8±0.2 µm. The vertically standing nanowires may increase the effective contact area on the keyboard 100, thus increasing triboelectric charges, which, in turn, increase the output performance of the keyboard 100. In some embodiments, nanowire arrays may be created on the layer 110 by a top-down method, such as reactive ion etching.

5.1 Surface Contact Angle

The keyboard 100 may have a surface contact angle of 160° in the presence of the nanostructures 130. In one experiment, the surface static contact angle was measured using a 2 µL water droplet according to a sessile droplet method. The inset of FIG. 22A shows the contour of a resting droplet 620. The scale bar in FIG. 22A may be approximately 500 nm. A contact angle of 160° was obtained by Young-Laplace fitting.

5.2 Surface Sliding Angle

Figure 22B:
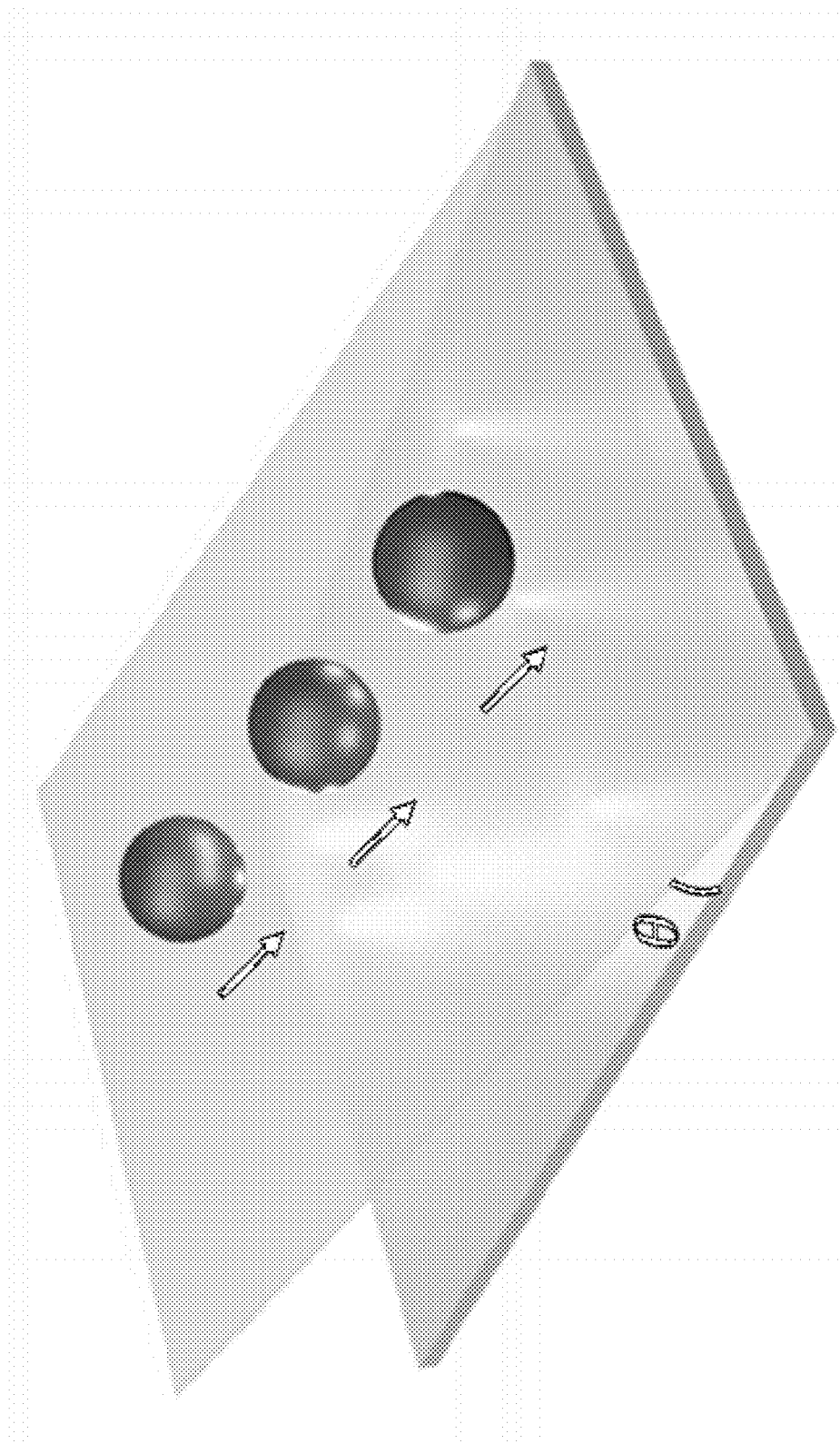
FIG. 22B illustrates a sliding angle measurement of the keyboard using a tilting base method according to one aspect of the disclosed technology.

The keyboard 100 may have a surface sliding angle of 7.2°±0.5° in the presence of the nanostructures 130. In one experiment, the surface sliding angle was measured according to a tilting base method. In the tilting base method, a liquid droplet slides down a tilted surface as illustrated in FIG. 22B. On the titled surface, gravity causes an increase in the contact angle on the downhill side and a decrease in the contact angle on the uphill side. The surface sliding angle may be obtained by gradually increasing the titled angle until the three-phase contact line starts to change. The surface sliding angle is the maximum tilted angle before the three-phase contact line changes. In the experiment, a water droplet with a fixed volume of 10 µL was dispensed onto the layer 110 of the keyboard 100 by a micro-syringe. Then, the keyboard 100 was titled slowly until the three-phase contact line started to change. A surface sliding angle of 7.2°±0.5° was observed.

5.3 Fabrication of Nanowires

According to one aspect of the disclosed technology, an array of nanowires may be created on the keyboard surface, such as a surface made of a FEP film, according to the following process. First, the FEP film is washed ordinally with menthol, isopropyl alcohol and deionized water, and is then dried with compressed nitrogen. Au is coated onto the FEP film as a nanoscale mask by DC sputtering. The AU layer has a thickness of 10 nm. The Au-coated FEP is placed into an ICP chamber. $O_2$, Ar, and $CF_4$ gases are introduced into the ICP chamber at flow rates of 10.0, 15.0, and 30.0 sccm, respectively. A power source of 400 W is used to generate a large density of plasma. Another power source of 100 W is used to accelerate plasma ions toward the FEP surface. The FEP surface is exposed to ICP reactive ion etching for 60 s.

5.4 Advantages

5.4.1 Increase Contact Area

Nanostructures 130 may increase the effective contact area of the keyboard 100. FIG. 23A provides an SEM image of a human finger surface. As shown in FIG. 23A, the skin surface has topographical roughness on a micro-scale and even on a nano-scale. The scale bar may be approximately 1 μm. The inset is a photograph of the human finger surface. The scale bar may be approximately 0.5 cm.

FIG. 23B illustrates the effective contact area between the skin and the keyboard 100 in the absence of nanostructures on the keyboard surface. Without nanostructures, asperities 140 on the skin may limit the contact area between the skin and the keyboard 100.

FIG. 23C illustrates the effective contact area between the skin and the keyboard 100 when the nanostructures 130 are present on the keyboard surface. As shown in FIG. 23C, with an average clustering diameter of 104±21 nm and a length of 0.8±0.2 μm, the nanostructures 130 are flexible and may be easily adapted to the skin asperities 140, thus resulting in an increase in the effective contact area between the skin and the keyboard 100.

Figure 24A:
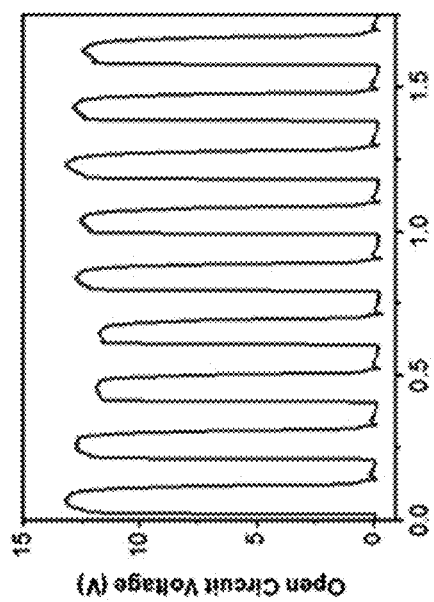
FIG. 24A illustrates the open-circuit voltage of a keyboard with FEP nanowires disposed thereon, when a key in zone "II" was repeatedly pressed.
Figure 24B:
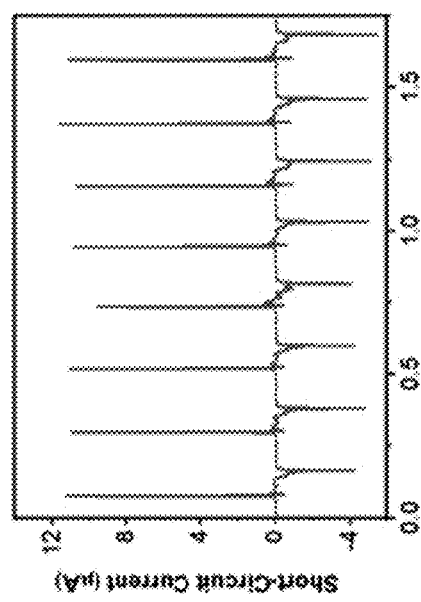
FIG. 24B illustrates the open-circuit voltage of a keyboard without FEP nanowires, when a key in zone "II" was repeatedly pressed.
Figure 24C:
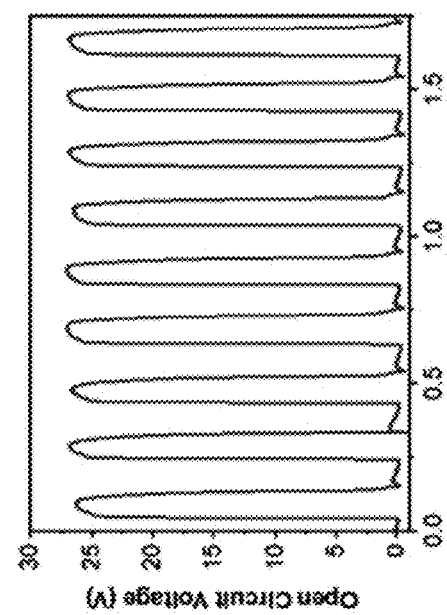
FIG. 24C illustrates the short-circuit current of a keyboard with FEP nanowires disposed thereon, when a key in zone "II" was repeatedly pressed.
Figure 24D:
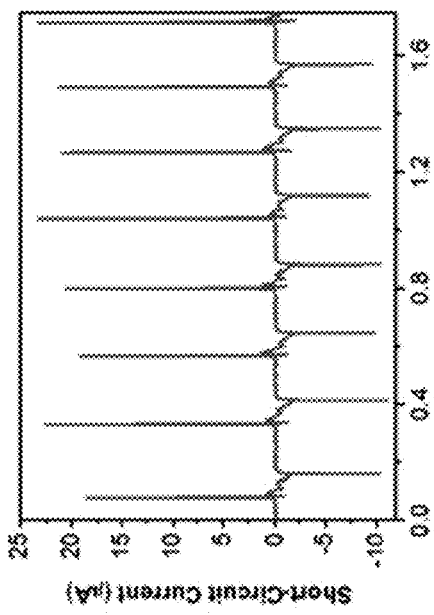
FIG. 24D illustrates the short-circuit current of a keyboard without FEP nanowires, when a key in zone "II" was repeatedly pressed.
Figure 25A:
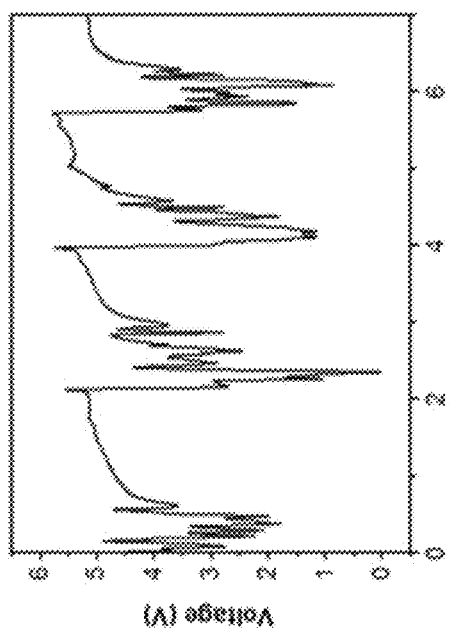
FIG. 25A illustrates the output voltage of a keyboard with FEP nanowires disposed thereon, when a user typed the word "touch" for more than three times on the keyboard according to his/her accustomed manner.
Figure 25B:
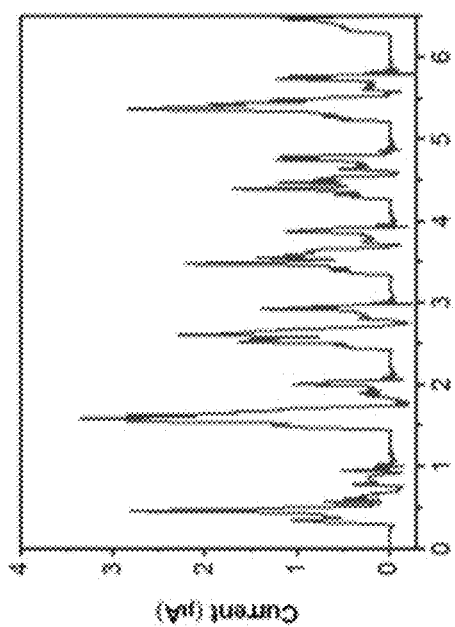
FIG. 25B illustrates the output voltage of a keyboard without FEP nanowires, when a user typed the word "touch" for more than three times on the keyboard according to his/her accustomed manner.
Figure 25C:
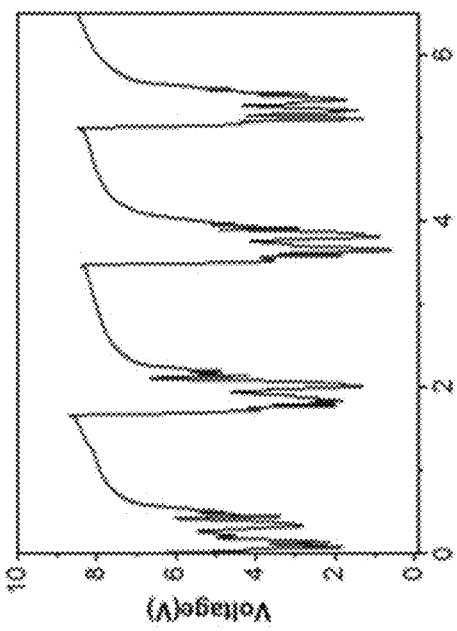
FIG. 25C illustrates the output current of a keyboard with FEP nanowires disposed thereon, when a user typed the word "touch" for more than three times on the keyboard according to his/her accustomed manner.
Figure 25D:
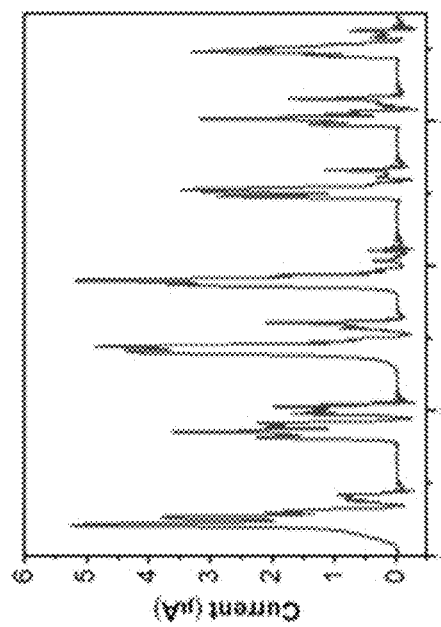
FIG. 25D illustrates the output current of a keyboard without FEP nanowires, when a user typed the word "touch" for more than three times on the keyboard according to his/her accustomed manner.

To evaluate the effect of the nanostructures, the keyboard 100 was tested with and without nanostructures in two typing modes. In the intermittent typing mode, a key in zone "II" was repeatedly tested. FIG. 24A and FIG. 24B respectively illustrate the open-circuit voltage of the keyboard with and without the nanostructures. FIG. 24C and FIG. 24D respectively illustrate the short-circuit current of the keyboard with and without the nanostructures. In the continuous typing mode, a user typed the word "touch" for more than three times on the keyboard according to his/her accustomed manner. FIG. 25A and FIG. 25B respectively illustrate the output voltage of the keyboard with and without the nanostructures. FIG. 25C and FIG. 25D respectively illustrate the output current of the keyboard with and without the nanostructures. As demonstrated in FIGS. 24A-D and FIGS. 25A-D, the nanostructures improve both the open-circuit voltage and the short-circuit current generated by the keyboard.

Figure 26:
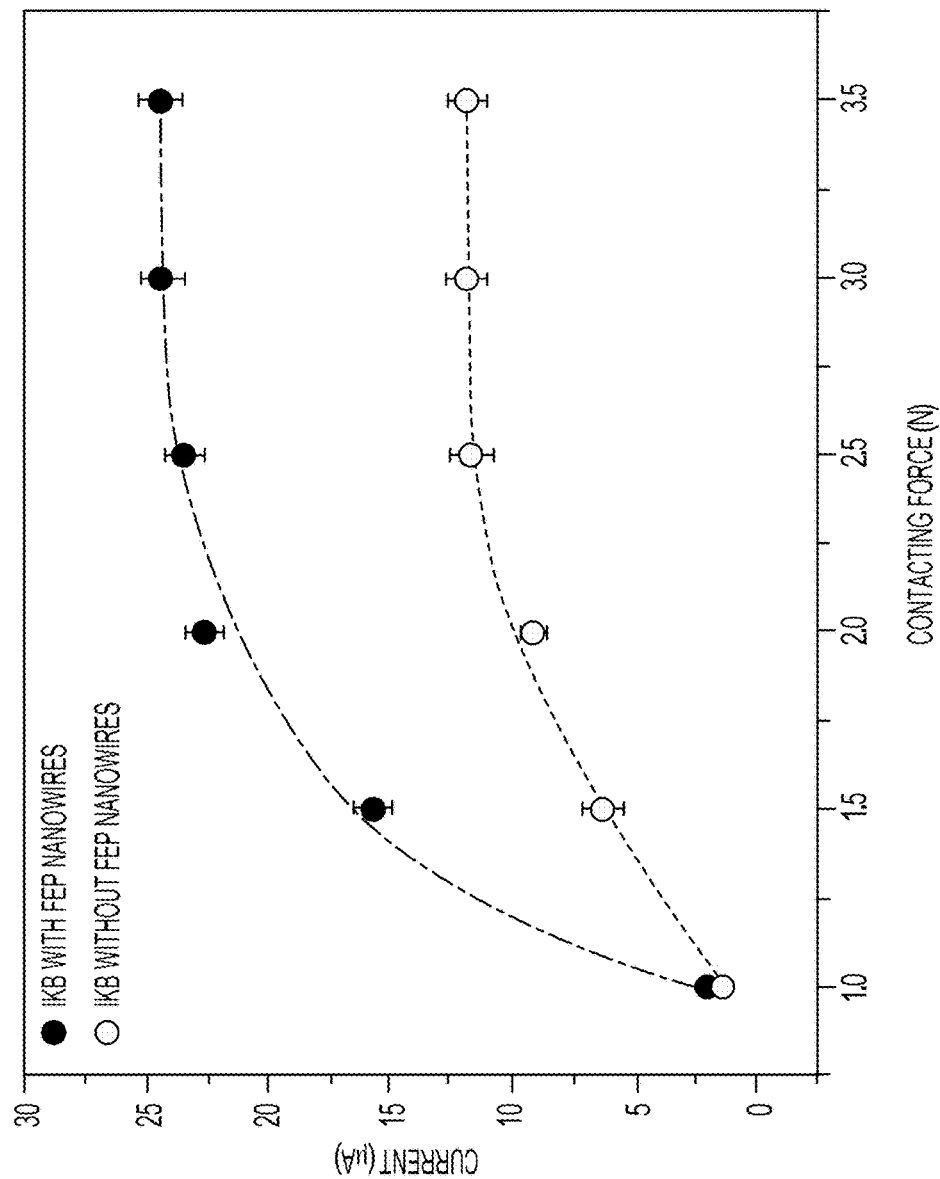
FIG. 26 illustrates a relationship between electric output of a keyboard and contact force applied to the keyboard in the presence and absence of FEP nanowires.

In one experiment, a dual-range force sensor was employed to quantitatively control the contact force. As illustrated in FIG. 26, the output current increases as the contact force increases regardless whether the nanostructures 130 are present. At any given contact force, the current output by the keyboard with the nanostructures is always larger than that without the nanostructures. As shown in FIG. 26, the output currents have different force sensitivities. Without the nanostructures, the output current reaches its saturation much faster. The larger the contact force, the greater the contact area. FIG. 26 confirms that the nanostructures increase the output performance of the keyboard.

5.4.2 Self Clean

The keyboard 100 has superhydrophobicity, or is extremely difficult to wet as a result of the nanostructures 130. The nanostructures 130 may keep the keyboard free from dirt and grime. As a result, the keyboard may be self-cleaned, or may be easily cleaned if contamination occurs.

6. Reproducibility and Reliability

Figure 27:
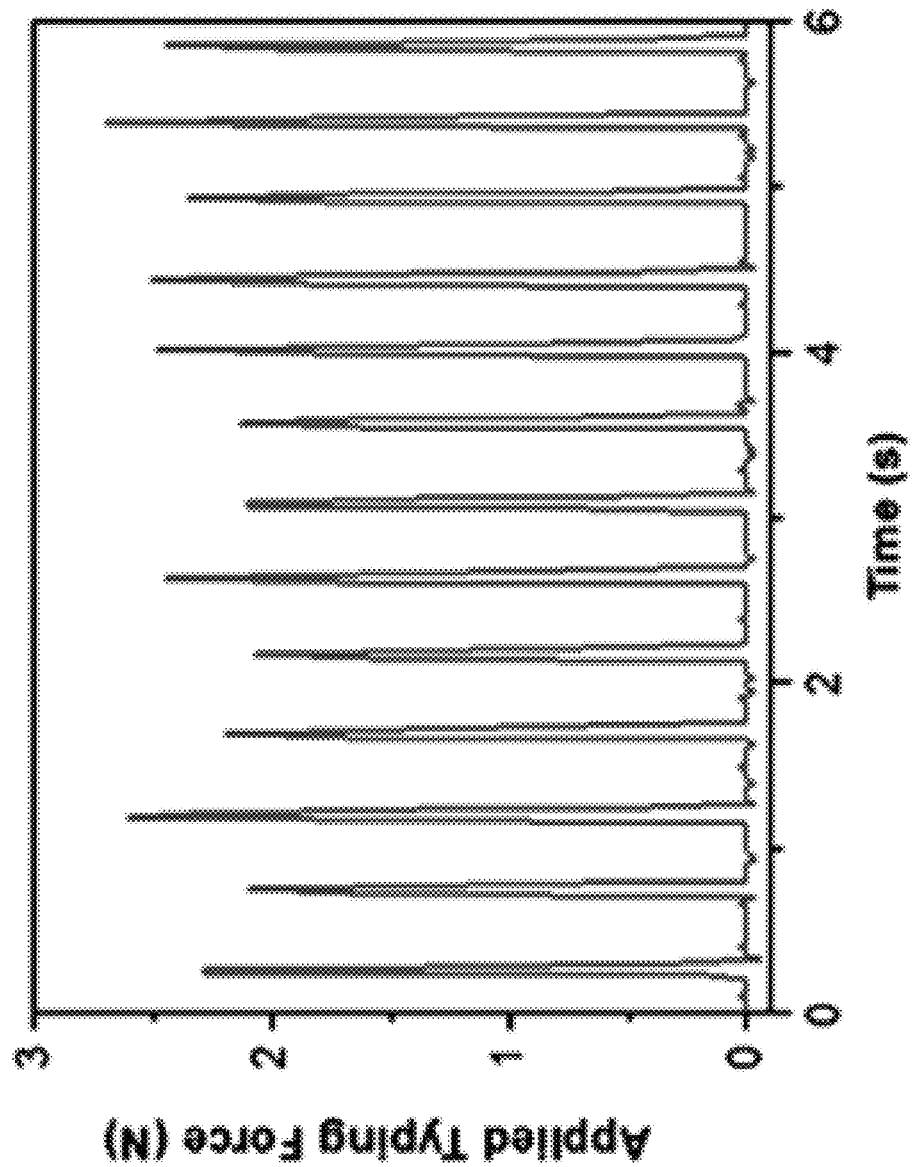
FIG. 27 illustrates typing force applied by an index finger to a keyboard during a mechanical durability test.

The keyboard 100 has high mechanical durability, robustness and output stability. An index finger may have an average typing force of approximately 2.3±0.2N, as illustrated in FIG. 27. In a mechanical durability test, a commonly used key, e.g., a key from zone II (see FIG. 18 for key classification), was pressed by applying a force at 2.3±0.2 N for 25000 times. FIG. 28A provides an SEM image (left image) of the keyboard surface with nanostructures before the test and an SEM image (right image) after the test. No permanent deformation to the keyboard surface or the nanostructures was detected as a result of the test. The scale bar in FIG. 28A may be approximately 500 nm.

Figure 28B:
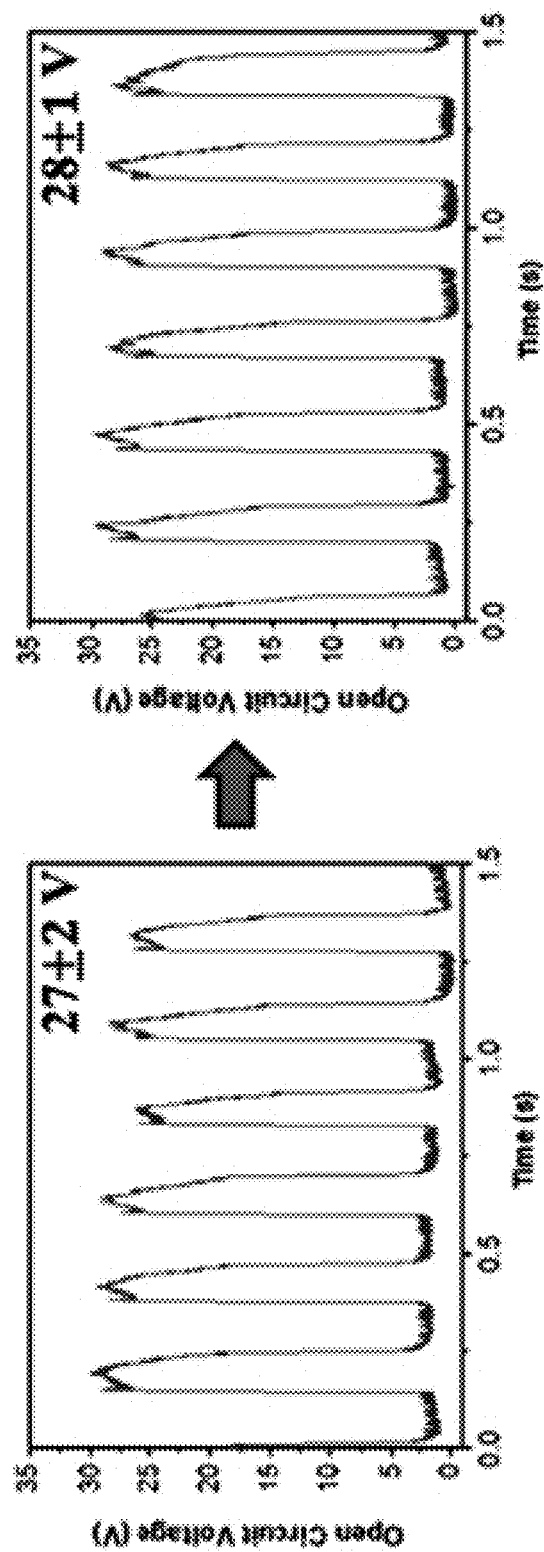
FIG. 28B illustrates the open circuit voltage of a keyboard before (left image) and after (right image) 25000 keystrokes.
Figure 28C:
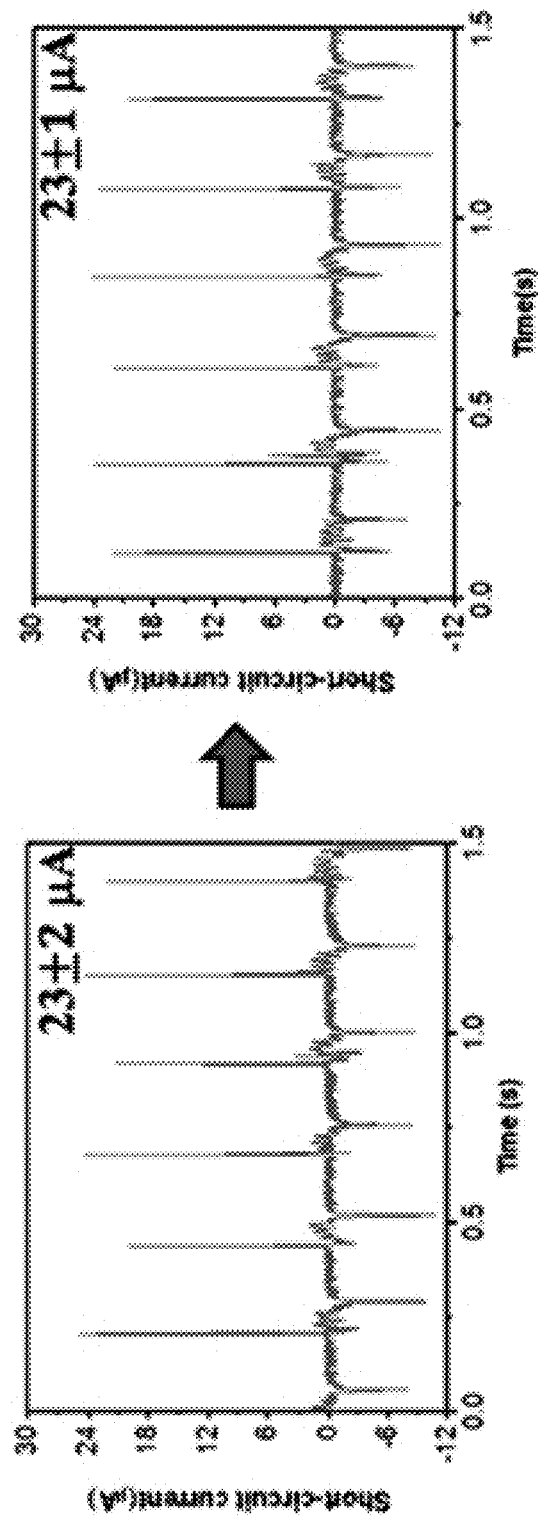
FIG. 28C illustrates the short-circuit current of a keyboard before (left image) and after (right image) 25000 keystrokes.
Figure 29:
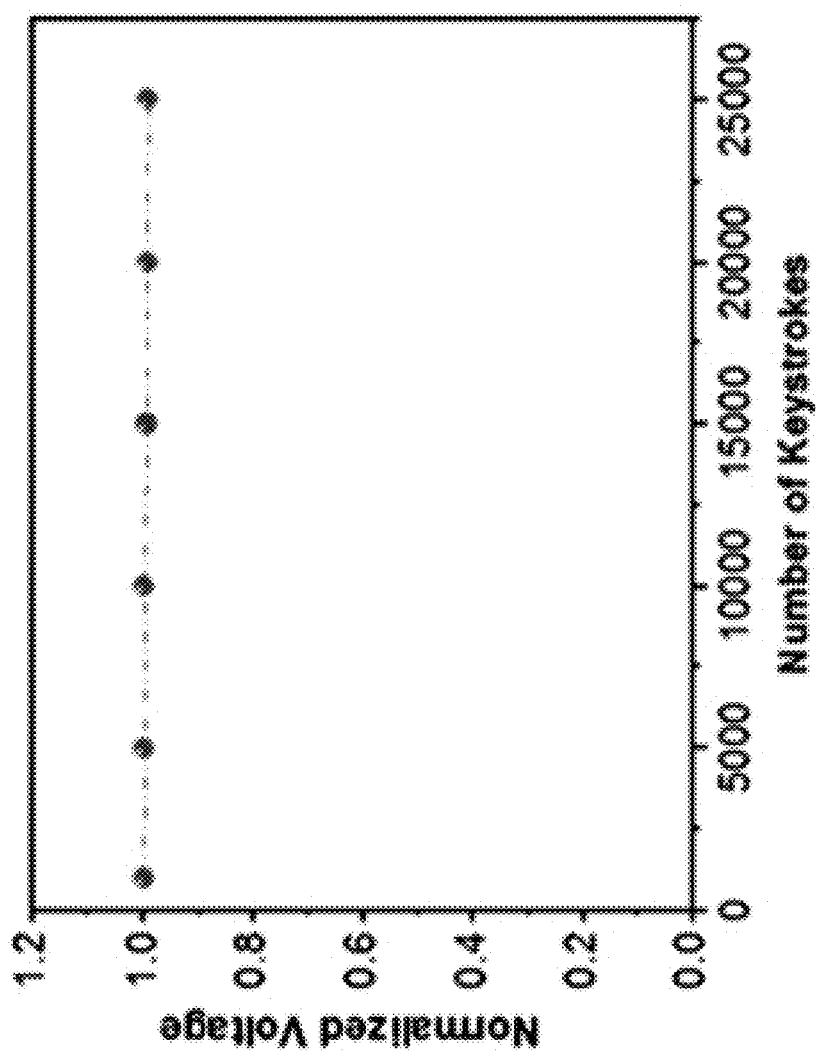
FIG. 29 illustrates the output voltage of a keyboard throughout 25,000 keystrokes.

FIG. 28B illustrates a comparison of the open circuit voltages generated by the keyboard 100 before (left image) and after (right image) the test. FIG. 28C illustrates a comparison of the short-circuit currents generated by the keyboard 100 before (left image) and after (right image) the test. Clearly, the keyboard 100 maintains about the same performance before and after the test. FIG. 29 illustrates a minor fluctuation of less than 0.8% in the output voltage throughout the period of 25,000 keystrokes.

Figure 30A:
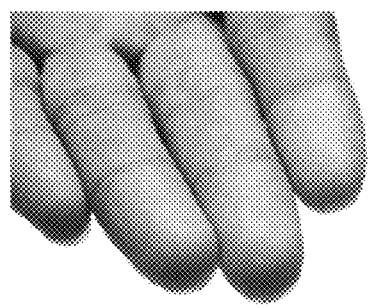
FIGS. 30A-B illustrate a user's hand before and after a long-distance run.
Figure 30B:
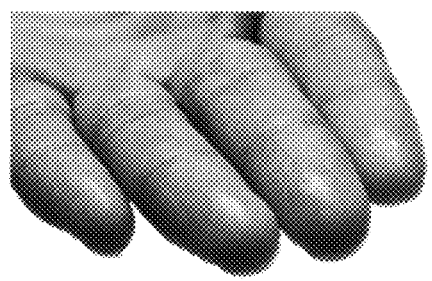
Figure 30C:
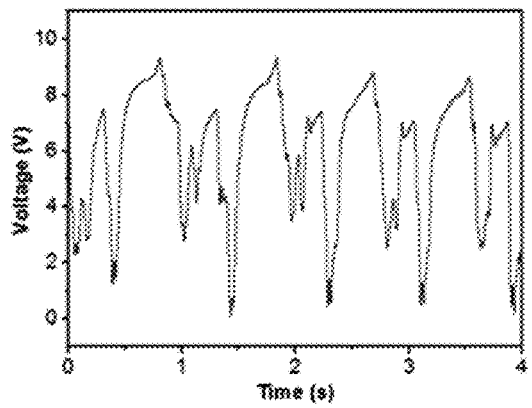
FIG. 30C illustrates the output voltage of a keyboard, when a user typed the word "touch" for more than four times on the keyboard according to the user's accustomed manner before the long-distance run.
Figure 30E:
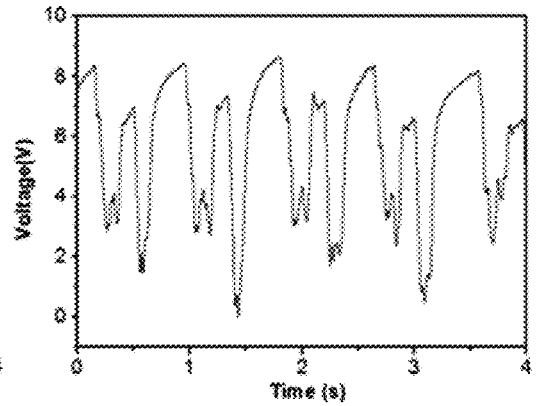
FIG. 30E illustrates the output voltage of the keyboard, when the user typed the word "touch" for more than four times on the keyboard according to the user's accustomed manner after the long-distance run.
Figure 30D:
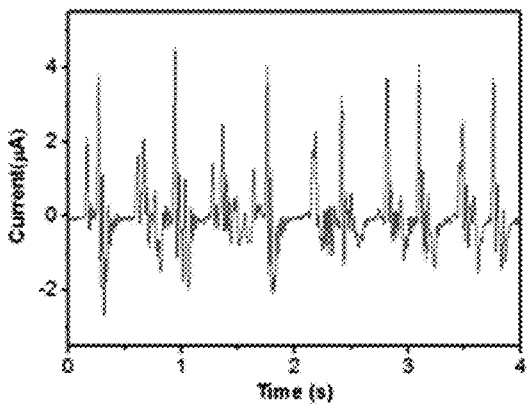
FIG. 30D illustrates the output current of the keyboard, when the user typed the word "touch" for more than four times on the keyboard according to the user's accustomed manner before the long-distance run.
Figure 30F:
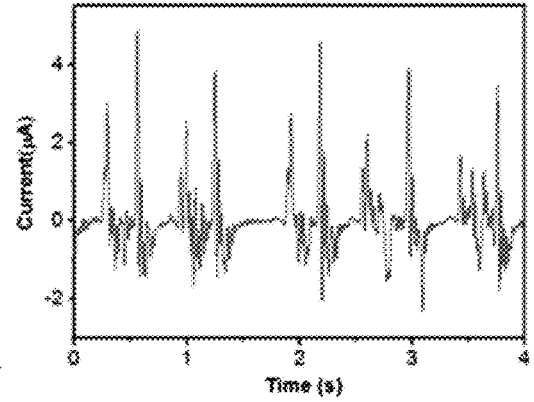
FIG. 30F illustrates the output current of the keyboard, when the user typed the word "touch" for more than four times on the keyboard according to the user's accustomed manner after the long-distance run.

The keyboard 100 may also maintain its performance regardless of the skin condition. For example, a sweaty hand may not adversely impact the output performance of the keyboard 100. In one experiment, a user typed the word "touch" for more than four times on the keyboard 100 according to his/her accustomed manner before a long-distance run, and repeated the same after the run. FIGS. 30A-B contrast the user's hand before and after the run, where FIG. 31A illustrates a clean hand before the run and FIG. 31B illustrates a sweaty hand after the run. FIG. 30C and FIG. 30E contrast the output voltage before and after the run, whereas FIG. 30D and FIG. 30F contrast the output current before and after run. As shown in these figures, the output voltage and the output current both maintain about the same magnitude and the same waveform regardless whether the hand is sweaty.

Figure 31:
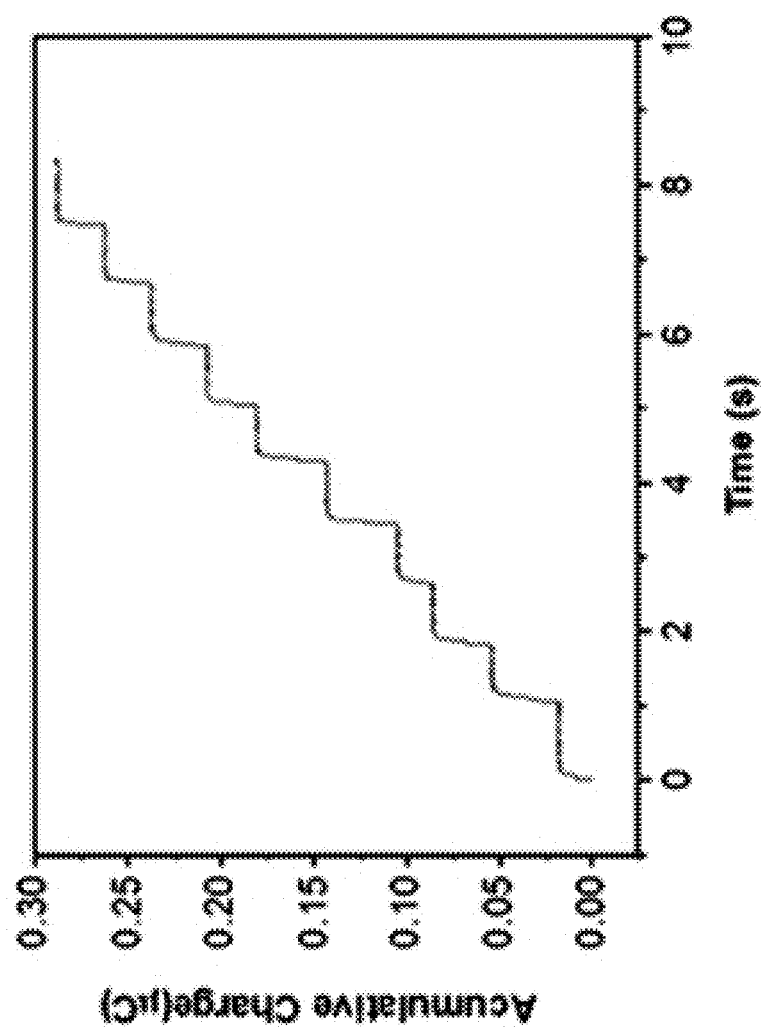
FIG. 31 illustrates accumulative induced charges generated by the keyboard, when a user wearing a pair of Latex gloves performs typing.

Further, the keyboard 100 may be highly sensitive and may effectively respond to insulating or conductive materials of any kinds. For example, the keyboard 100 may effectively detect keystroke events even if a user wears gloves. In one experiment, the keyboard 100 was tested by a user wearing a pair of Latex gloves. FIG. 31 shows accumulative induced charges throughout the experiment. Each step in FIG. 31 represents the output current caused by a keystroke event. On average, 39 nC of induced charges are generated, which is comparable to or even better than the output performance without the gloves.

7. Summary

Embodiments of a non-mechanical keyboard are described herein. The keyboard is less intrusive, user friendly and can be self-cleaned. Its fabrication process is straightforward and compatible with possible large-scale manufacturing needs. Further, the keyboard described herein has high energy conversion efficiency, delivers superior output performance, and exhibits high robust characteristics.

The keyboard may serve as part of a highly accurate authentication system for identifying behavioral biometrics. The authentication system may be easily implemented as an add-on to an existing authentication system with little or no alteration to the existing system.

Further, the keyboard may convert typing energy into electricity for sensing or energy harvesting purposes. The keyboard may be self-powered or power electronic devices, including but not limited to LEDs, sensors, portable devices and energy storage units.

Further, the present technology may be adapted to many applications, including but not limited to, artificial intelligence, cyber security, computer or network access control, cash register, automated banking machine, musical instruments, game machines, recording/outputting, financial management, bill payment and personal communications, among many other possibilities.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended. The term "exemplary" used herein does not mean best mode, but rather, example.

Accordingly, those skilled in the art will appreciate that the conception upon which the application and claims are based may be readily utilized as a basis for the design of other structures, methods, and systems for carrying out the several purposes of the embodiments and claims disclosed in this application. It is important, therefore, that the claims be regarded as including such equivalent constructions.

Furthermore, the purpose of the foregoing Abstract is to enable the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

The invention claimed is:

1. A keyboard comprising:
a plurality of keys, at least one of the keys including:
two electrodes; and
a member generating triboelectric charges upon skin contact, the member being adjacent to one of the electrodes to affect a flow of electrons between the two electrodes when a distance between the member and the skin varies.

2. The keyboard of claim 1, wherein the member includes at least one of the following materials: polyethylene terephthalate, poly(methyl methacrylate), polydimethylsiloxane, polytetrafluoroethylene, fluorinated ethylene propylene, poly(vinyl chloride), polyimide, metal and alloy.

3. The keyboard of claim 1, wherein the electrodes include at least one of the following materials: metal, indium tin oxide and conductive polymer.

4. The keyboard of claim 1, further comprising an insulation material disposed between the two electrodes.

5. The keyboard of claim 4, wherein the insulation material includes polyethylene terephthalate.

6. The keyboard of claim 1, wherein the member includes a plurality of nanostructures formed thereon.

7. The keyboard of claim 1, wherein the flow of electrons powers the keyboard.

8. The keyboard of claim 1, wherein the flow of electrons powers a rechargeable energy storage unit.

9. The keyboard of claim 1, wherein the flow of electrons powers an electronic device.

10. The keyboard of claim 1, wherein the member affects the flow of electrons between the two electrodes when a keystroke occurs.

11. A system for determining information related to a keystroke event comprising:
a key of a keyboard including:
two electrodes, and
a surface that generates triboelectric charges upon skin contact, the surface generating a flow of electrons between the two electrodes when the keystroke event occurs, wherein the keyboard generates a current and a voltage when the keystroke event occurs;
an acquisition system in communication with the keyboard to acquire a measurement of at least one of the current and the voltage; and
a processor in communication with the acquisition system to determine information related to the keystroke event based on the measurement.

12. The system of claim 11, wherein the surface of the keyboard includes at least one of the following materials: polyethylene terephthalate, poly(methyl methacrylate), polydimethylsiloxane, polytetrafluoroethylene, fluorinated ethylene propylene, poly(vinyl chloride), polyimide, metal and alloy.

13. The system of claim 11, wherein the information related to the keystroke event includes an input character associated with the keystroke event.

14. The system of claim 11, wherein the information related to the keystroke event includes a behavioral biometric of a user that performs the keystroke event.

15. The system of claim 11, wherein the information related to the keystroke event includes a typing pattern of a user that performs the keystroke event.

16. The system of claim 11, wherein the information related to the keystroke event includes at least one of the following: keystroke manner, keystroke rhythm, typing habit, typing force, typing speed, finger dimension and bioelectricity.

17. The system of claim 11, wherein the acquisition system is a multi-channel data acquisition system including a plurality of channels each associated with a key of the keyboard, and each channel acquires a measurement of at least one of the current and the voltage generated by its associated key at a keystroke event.

18. The system of claim 11, wherein the processor performs at least one of a frequency-domain transformation and a wavelet transformation on the measurement acquired by the acquisition system to determine a typing pattern.

19. The system of claim 18, wherein the processor compares the determined typing pattern to a predetermined typing pattern to authenticate a user that performs the keystroke event.

20. The system of claim 11, wherein the processor calculates a Pearson correlation coefficient based on the measurement acquired by the acquisition system, and compares the Pearson correlation coefficient to a threshold to authenticate a user that performs the keystroke event.

21. The system of claim 11, wherein the processor determines a string of characters from a plurality of keystroke events performed by a user, and compares the string of characters to a predetermined character string to authenticate the user.

22. A method for determining information related to a keystroke event comprising:
generating, by a keyboard, a current and a voltage when a keystroke event occurs, the keyboard including a key that has two electrodes and a surface that generates triboelectric charges upon skin contact;
generating, by the surface, a flow of electrons between the two electrodes when the keystroke event occurs;
acquiring, by an acquisition system, a measurement of at least one of the current and the voltage generated by the keyboard; and
determining, by a processor, information related to the keystroke event based on the measurement.

23. The method of claim 22, wherein the information related to the keystroke event includes an input character associated with the keystroke event.

24. The method of claim 22, wherein the information related to the keystroke event includes a behavioral biometric of a user that performs the keystroke event.

25. The method of claim 22, wherein the information related to the keystroke event includes a typing pattern of a user that performs the keystroke event.

26. The method of claim 22, wherein the information related to the keystroke event includes at least one of the following: keystroke manner, keystroke rhythm, typing habit, typing force, typing speed, finger dimension and bioelectricity.

27. The method of claim 22, further comprising performing, by the processor, at least one of a frequency-domain transformation and a wavelet transformation on the measurement acquired by the acquisition system to determine a typing pattern.

28. The method of claim 27, further comprising comparing, by the processor, the determined typing pattern to a predetermined typing pattern to authenticate a user that performs the keystroke event.

29. The method of claim 22, further comprising calculating, by the processor, a Pearson correlation coefficient, by the processor, based on the measurement acquired by the acquisition system, and comparing the Pearson correlation coefficient to a threshold to authenticate a user that performs the keystroke event.

30. The method of claim 22, further comprising determining, by the processor, a string of characters from a plurality of keystroke events performed by a user, and comparing the string of characters to a predetermined character string to authenticate the user.

31. An authentication system comprising:
a key of a keyboard including:
two electrodes, and
a surface that generates triboelectric charges upon skin contact, the surface generating a flow of electrons between the two electrodes when a user performs a keystroke event, wherein the keyboard generates a current and a voltage when the keystroke event occurs;
an acquisition system in communication with the keyboard to acquire a measurement of at least one of the current and the voltage;
a non-transitory computer-readable storage medium storing authentication information; and
a processor in communication with the acquisition system to determine information related to the keystroke event based on the measurement, the processor authenticating the user by comparing the determined information to the authentication information.

32. The system of claim 31, wherein the determined information includes a string of input characters associated with a plurality of keystroke events, and the authentication information includes a predetermined character string.

33. The system of claim 31, wherein the information related to the keystroke event includes a behavioral biometric of a user that performs the keystroke event, and the authentication information includes a predetermined behavioral biometric.

34. The system of claim 31, wherein the information related to the keystroke event includes a typing pattern of a user that performs the keystroke event, and the authentication information includes a predetermined typing pattern.

35. The system of claim 31, wherein the information related to the keystroke event includes at least one of the following: keystroke manner, keystroke rhythm, typing habit, typing force, typing speed, finger dimension and bioelectricity.

36. A power generation system comprising:
a keyboard comprising a plurality of keys, at least one of the keys including:
two electrodes; and
a member generating triboelectric charges upon skin contact, the member being adjacent to one of the electrodes to affect a flow of electrons between the two electrodes when a distance between the member and the skin varies.

37. The power generation system of claim 36, further comprising a power management circuit configured to receive a current output by the keyboard and output a current to charge a rechargeable energy storage unit.

38. The power generation system of claim 37, wherein the rechargeable energy storage unit includes at least one of a rechargeable battery and a capacitor.

39. The power generation system of claim 37, wherein the power management circuit includes at least one of a rectifier, an integrated power control circuit and a transformer.

40. An alarming system comprising:
an alarm;
a non-mechanical keyboard; and
a signal-processor circuit coupled to the keyboard and in operational communication with the alarm, the circuit configured to set off the alarm when a keystroke occurs on the keyboard,
wherein the keyboard includes a plurality of keys and at least one of the keys includes:
two electrodes; and
a member generating triboelectric charges upon skin contact, the member being adjacent to one of the electrodes to affect a flow of electrons between the two electrodes when a distance between the member and the skin varies.

41. The alarming system of claim 40, wherein the alarm is a wireless alarm having a remote receiver.

42. The alarm system of claim 40, wherein the circuit includes a remote transmitter.

43. The alarm system of claim 40, wherein the circuit includes an IC timer to switch the alarm on and off.

44. The alarming system of claim 40, wherein the alarm outputs a sound, a flashing light, or a combination thereof when set off.

45. An input device comprising:
- a plurality of keystroke input members, at least one of the members including:
  - two electrodes; and
  - a layer generating triboelectric charges upon skin contact, the layer generating a flow of electrons between the two electrodes when a keystroke occurs.

46. A key for a keyboard comprising:
- two electrodes; and
- a layer generating triboelectric charges upon skin contact, the layer generating a flow of electrons between the two electrodes when a distance between the key and the skin varies.

* * * * *